US012387609B2

(12) United States Patent
Iwase

(10) Patent No.: US 12,387,609 B2
(45) Date of Patent: Aug. 12, 2025

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventor: Hiroaki Iwase, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 285 days.

(21) Appl. No.: 16/636,636

(22) PCT Filed: Oct. 25, 2017

(86) PCT No.: PCT/JP2017/038523
§ 371 (c)(1),
(2) Date: Feb. 4, 2020

(87) PCT Pub. No.: WO2019/082301
PCT Pub. Date: May 2, 2019

(65) Prior Publication Data
US 2020/0379487 A1    Dec. 3, 2020

(51) Int. Cl.
*G05D 1/00*  (2024.01)
*G06V 20/13* (2022.01)
(Continued)

(52) U.S. Cl.
CPC .............. *G08G 5/26* (2025.01); *G05D 1/101* (2013.01); *G05D 1/106* (2019.05); *G06V 20/13* (2022.01);
(Continued)

(58) Field of Classification Search
CPC ........ G05D 1/101; G05D 1/106; G05D 1/637; B64C 39/024; B64C 2201/141;
(Continued)

(56) References Cited

U.S. PATENT DOCUMENTS 5,581,250 A * 12/1996 Khvilivitzky ........ G08G 5/0086
382/104
6,122,572 A *  9/2000 Yavnai ................. G05D 1/0088
342/16
(Continued)

FOREIGN PATENT DOCUMENTS

JP      2017-519297 A     7/2017
WO   WO-2017145543 A1 *  8/2017 ......... G06K 9/00805
WO   WO-2018061256 A1 *  4/2018 ............... B60R 1/00

*Primary Examiner* — Helal A Algahaim
*Assistant Examiner* — Karen Lynelle Furgason
(74) *Attorney, Agent, or Firm* — HEA Law PLLC

(57) ABSTRACT

A specific object is quickly detected to improve safety of flight. A control unit of an unmanned aerial vehicle control system obtains an image in which surroundings of an unmanned aerial vehicle are captured, the unmanned aerial vehicle being movable in any direction. A control unit for obtaining movement direction information about a movement direction of the unmanned aerial vehicle. A control unit for specifying a part to be processed in the image based on the movement direction information. A control unit for performing detection processing on the part to be processed to detect a specific object. A flight control unit for controlling flight of the unmanned aerial vehicle based on a result of the detection processing.

20 Claims, 17 Drawing Sheets

(51) Int. Cl.
    *G06V 20/17*      (2022.01)
    *G08G 5/26*       (2025.01)
    *G08G 5/50*       (2025.01)
    *G08G 5/55*       (2025.01)
    *B64U 101/30*     (2023.01)
    *G08G 5/21*       (2025.01)
    *G08G 5/53*       (2025.01)
    *G08G 5/57*       (2025.01)
    *G08G 5/80*       (2025.01)

(52) U.S. Cl.
    CPC .............. *G06V 20/17* (2022.01); *G08G 5/50* (2025.01); *G08G 5/55* (2025.01); *B64U 2101/30* (2023.01); *B64U 2201/10* (2023.01); *B64U 2201/104* (2023.01); *B64U 2201/20* (2023.01); *G08G 5/21* (2025.01); *G08G 5/53* (2025.01); *G08G 5/57* (2025.01); *G08G 5/80* (2025.01)

(58) Field of Classification Search
    CPC ................ B64C 2201/146; B64D 47/08; G08G 5/0047; G08G 5/0021; G08G 5/0052; G08G 5/0069; G08G 5/045
    See application file for complete search history.

(56) References Cited

U.S. PATENT DOCUMENTS

| | | | |
|---|---|---|---|
| 6,804,607 B1* | 10/2004 | Wood | G05D 1/1062 340/425.5 |
| 8,634,980 B1* | 1/2014 | Urmson | B60T 17/221 701/23 |
| 9,583,012 B1* | 2/2017 | Loftis | G06V 10/255 |
| 9,623,905 B2* | 4/2017 | Shashua | B62D 15/025 |
| 2009/0102630 A1* | 4/2009 | Nordlund | G06T 7/277 340/436 |
| 2010/0134325 A1* | 6/2010 | Gomi | B60R 1/00 348/148 |
| 2010/0305857 A1* | 12/2010 | Byrne | G06T 7/73 382/107 |
| 2013/0107050 A1* | 5/2013 | Maruoka | G08G 1/166 348/148 |
| 2014/0204267 A1* | 7/2014 | Akiba | H04N 23/73 348/362 |
| 2014/0316616 A1* | 10/2014 | Kugelmass | G06T 11/206 701/8 |
| 2015/0260526 A1* | 9/2015 | Paduano | G01S 15/89 701/461 |
| 2015/0370250 A1* | 12/2015 | Bachrach | G05D 1/0027 701/2 |
| 2015/0379876 A1 | 12/2015 | Navot et al. | |
| 2017/0078552 A1* | 3/2017 | Pochon | B64D 47/08 |
| 2017/0113689 A1* | 4/2017 | Gordon | B60W 60/0053 |
| 2017/0176990 A1* | 6/2017 | Keller | G01S 17/42 |
| 2018/0012504 A1* | 1/2018 | van Cruyningen | G08G 5/003 |
| 2018/0032040 A1* | 2/2018 | Sweet, III | G05D 1/102 |
| 2018/0032074 A1* | 2/2018 | Clynne | G08G 5/04 |
| 2018/0040251 A1 | 2/2018 | Navot et al. | |
| 2018/0048827 A1* | 2/2018 | Seydoux | B64C 39/024 |
| 2018/0284234 A1* | 10/2018 | Curatu | G05D 1/0088 |
| 2019/0026918 A1* | 1/2019 | Gomezcaballero | G08G 1/16 |
| 2020/0031281 A1* | 1/2020 | Watanabe | G06T 17/05 |
| 2020/0183425 A1* | 6/2020 | Yamashita | G05D 1/0204 |

\* cited by examiner

FIG.7
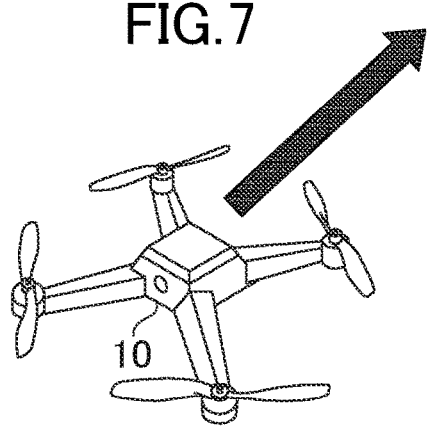
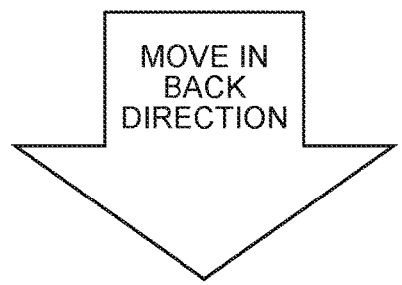
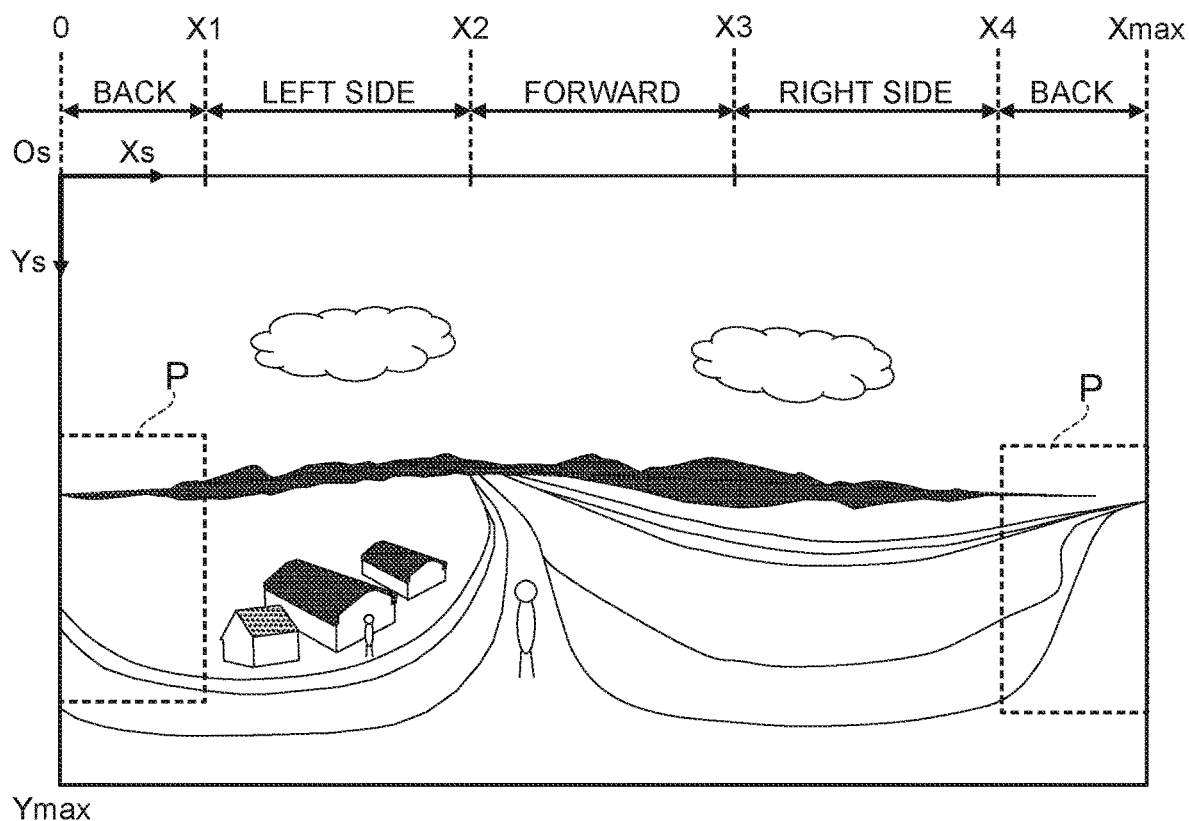

FIG.8
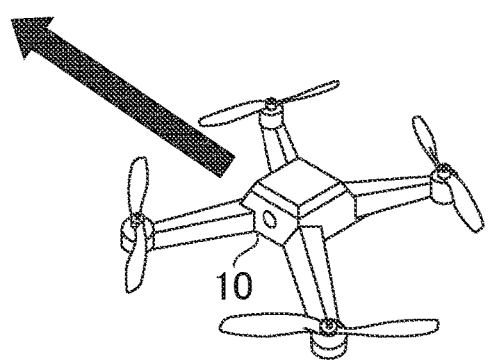
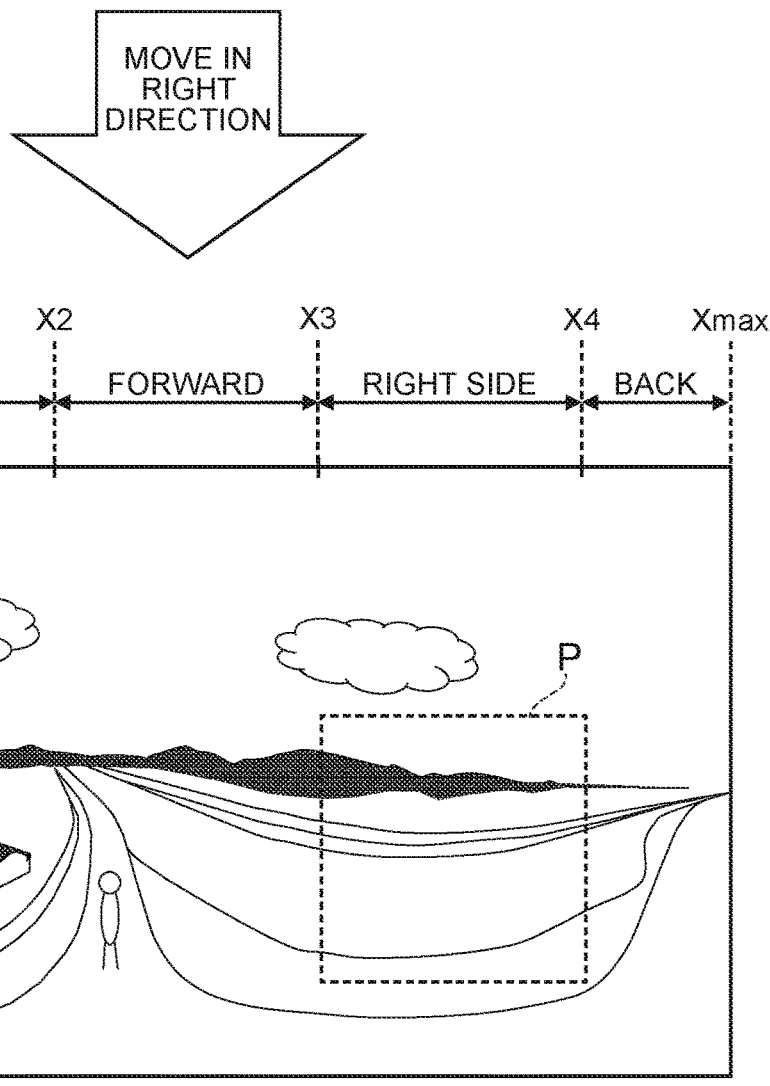

FIG.13
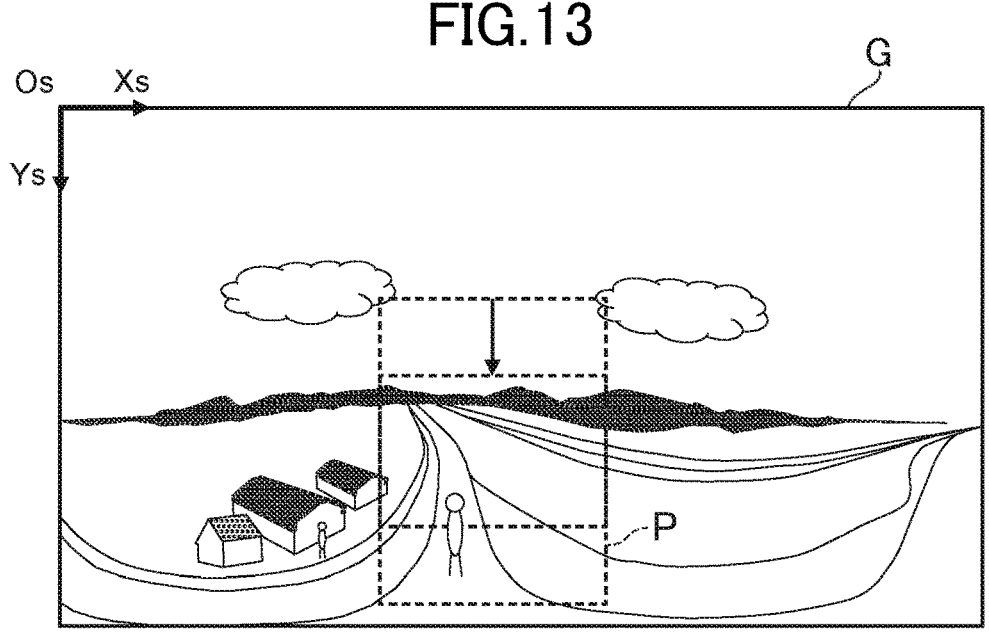
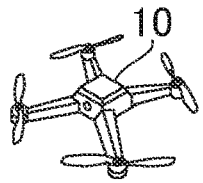
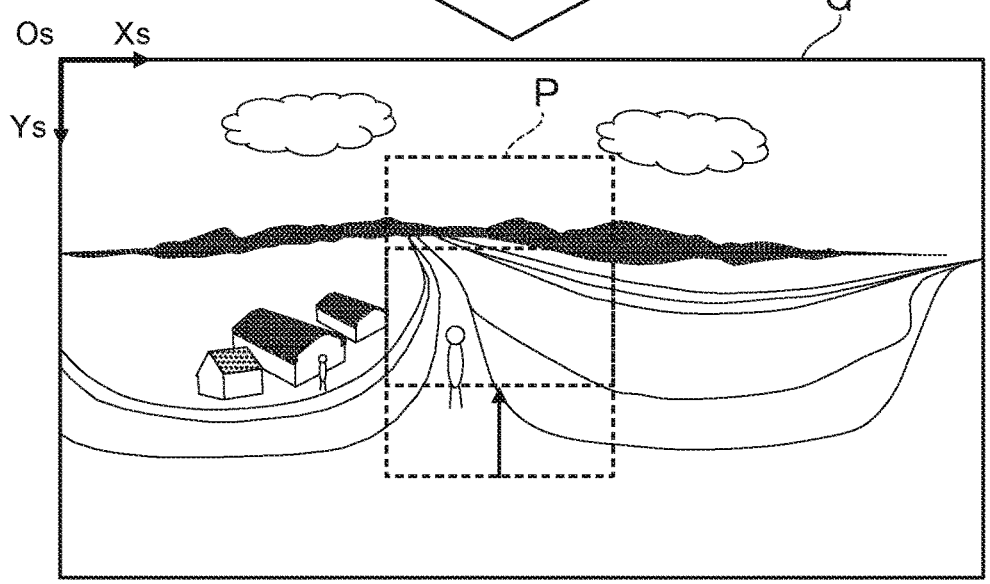

FIG.14
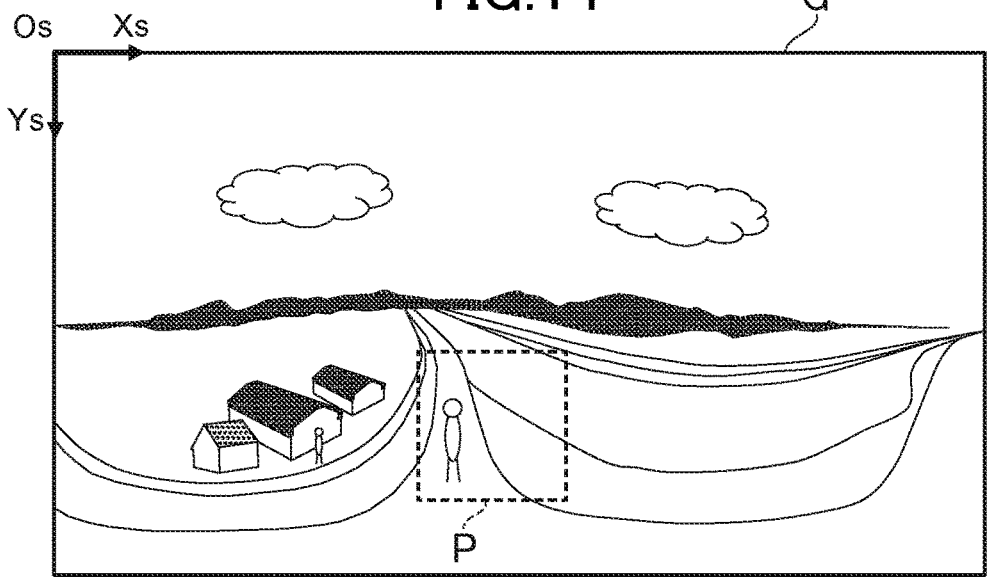
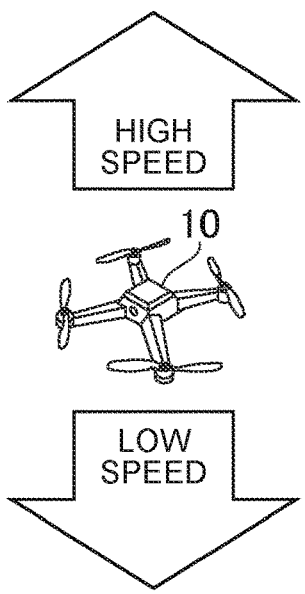
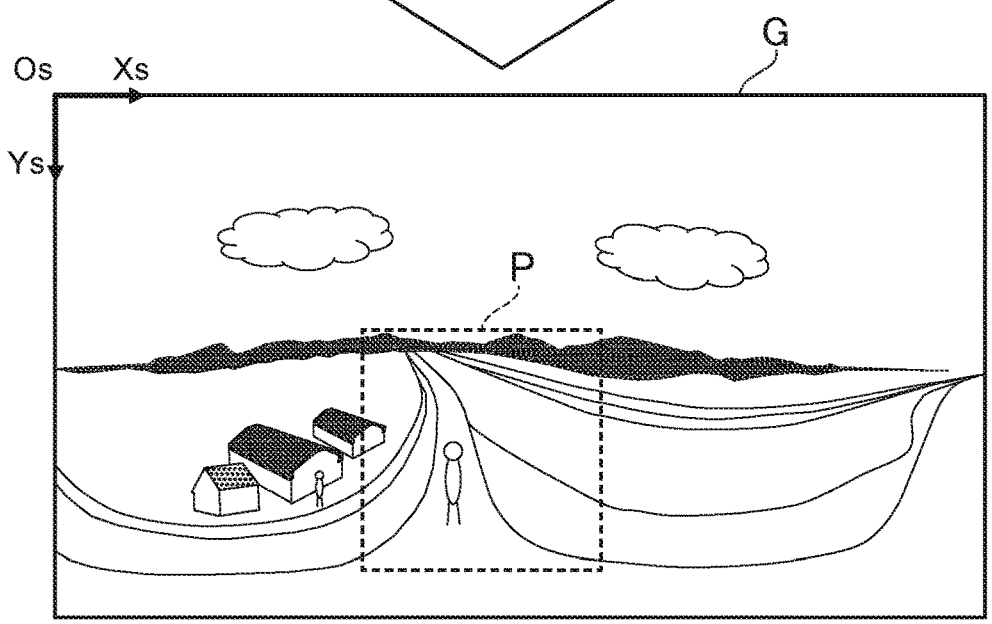

FIG.15
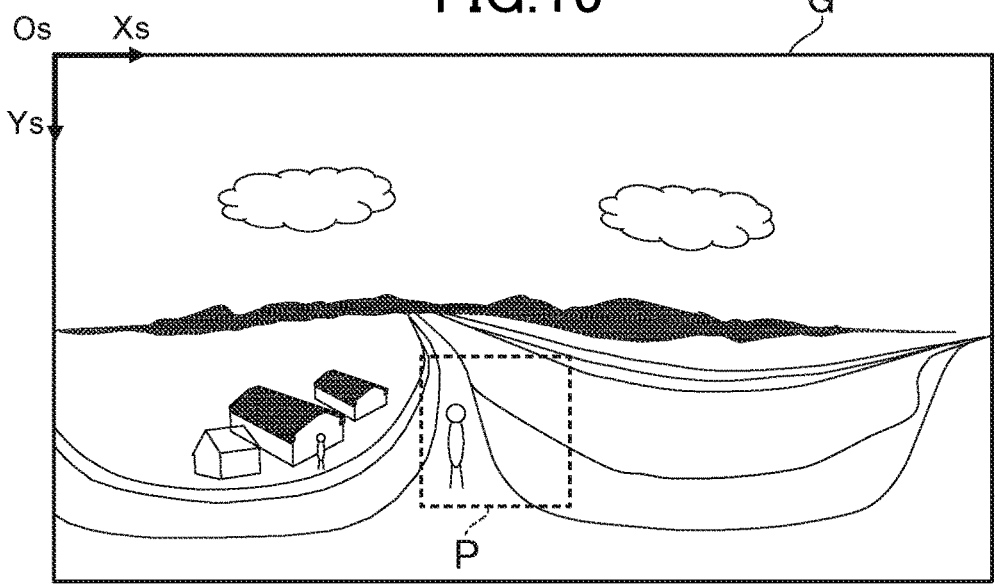
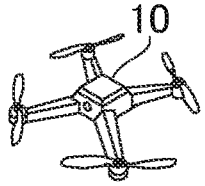
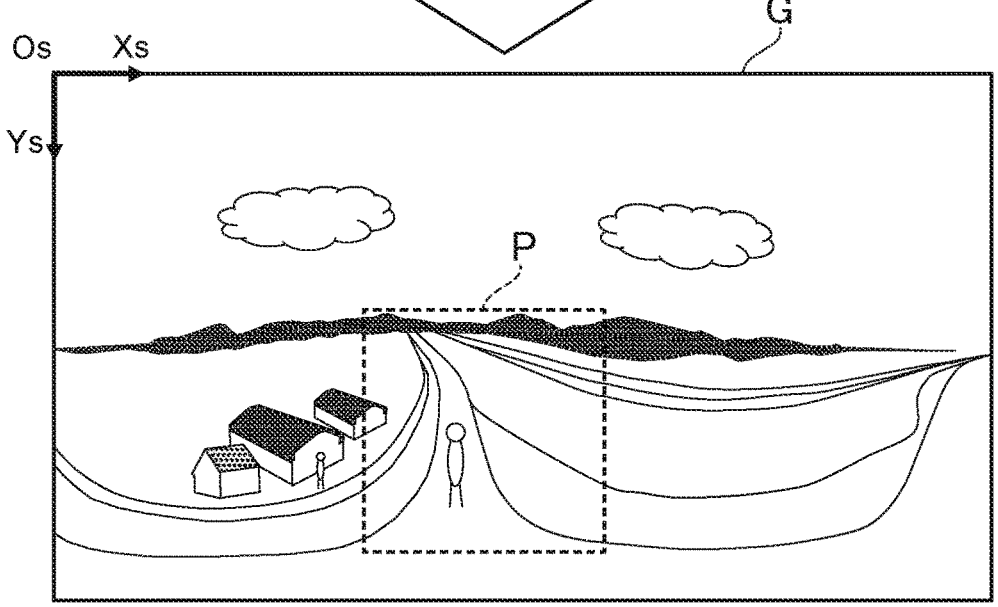

FIG.16
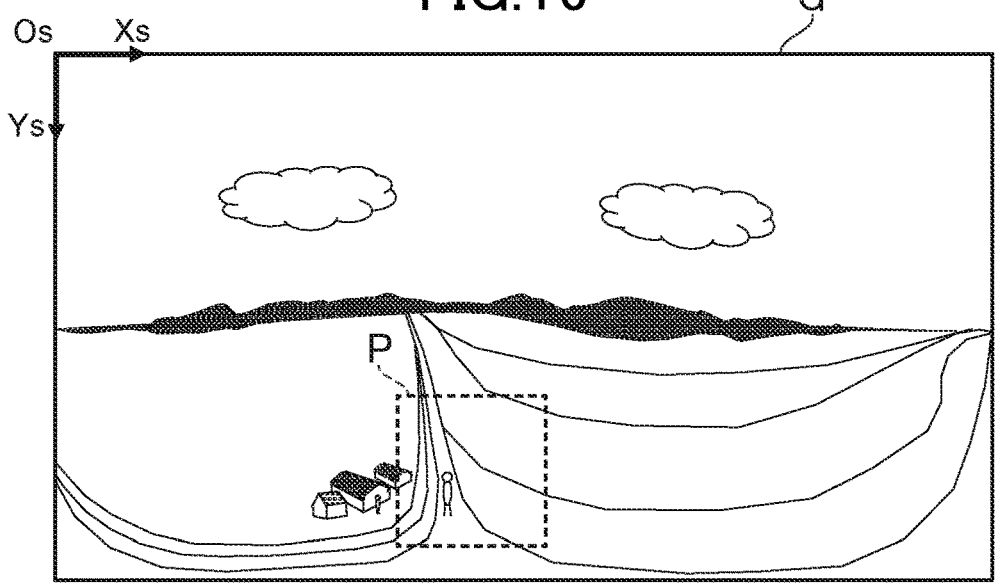
HIGH ALTITUDE
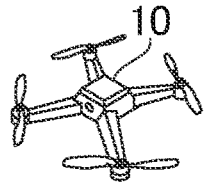
LOW ALTITUDE
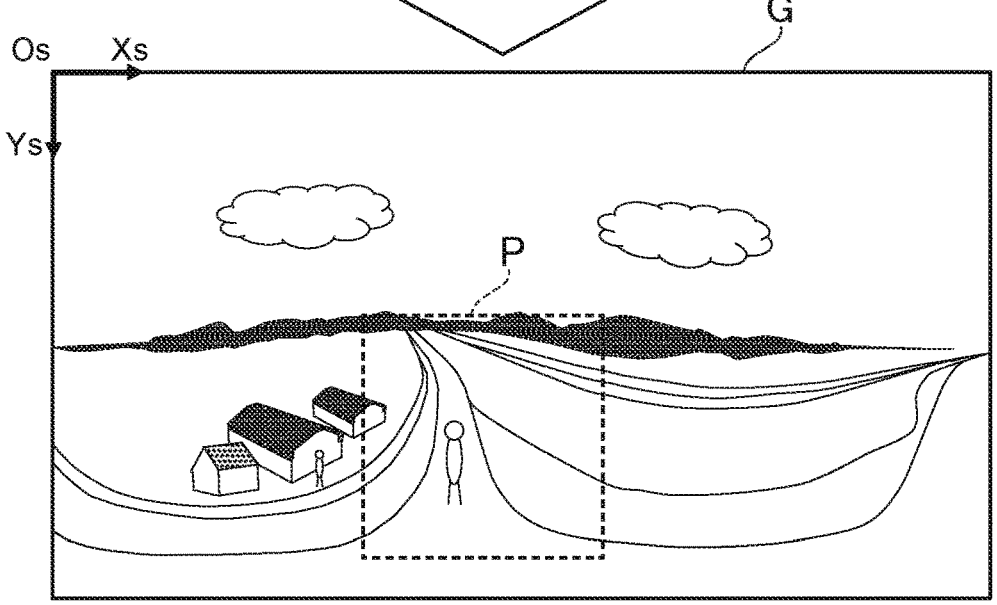

UNMANNED AERIAL VEHICLE CONTROL SYSTEM, UNMANNED AERIAL VEHICLE CONTROL METHOD, AND PROGRAM

CROSS REFERENCE TO RELATED APPLICATIONS

This application is a National Stage of International Application No. PCT/JP2017/038523 filed on Oct. 25, 2017. The contents of the above document is incorporated herein by reference in its entirety.

TECHNICAL FIELD

The present invention relates to an unmanned aerial vehicle control system, an unmanned aerial vehicle control method, and a program.

BACKGROUND ART

There are known techniques for controlling flight of an unmanned aerial vehicle that is movable in any of up-down, left-right, and forward-back directions. For example, Patent Literature 1 describes the techniques for determining whether a specific object is detected in an image captured by an unmanned aerial vehicle, and if the specific object is detected, the unmanned aerial vehicle is controlled to avoid the object.

CITATION LIST

Patent Literature

Patent Literature 1: JP2017-519297A

SUMMARY OF INVENTION

Technical Problem

In the above techniques, the specific object is to be detected quickly so as to improve safety of flight. In this regard, for example, for an aircraft that basically flies in the forward direction (does not basically fly in up-down, left-right, and back directions), such as a passenger airplane, capturing an image in the forward direction is enough. However, an unmanned aerial vehicle movable in any direction may fly in directions other than forward, and thus a wide range of the surroundings is to be captured. As such, image processing is to be performed for a wider range, and detection of the specific object tends to be delayed.

One or more embodiments of the present invention have been conceived in view of the above, and an object thereof is to quickly detect a specific object to improve safety of flight.

Solution to Problem

In response to the above described issues, an unmanned aerial vehicle control system according to the present invention includes image obtaining means for obtaining an image in which surroundings of an unmanned aerial vehicle are captured, the unmanned aerial vehicle being movable in any direction, movement direction obtaining means for obtaining movement direction information about a movement direction of the unmanned aerial vehicle, specifying means for specifying a part to be processed in the image based on the movement direction information, processing means for performing detection processing on the part to be processed to detect a specific object, and flight control means for controlling flight of the unmanned aerial vehicle based on a result of the detection processing.

An unmanned aerial vehicle control method according to the present invention includes the steps of obtaining an image in which surroundings of an unmanned aerial vehicle are captured, the unmanned aerial vehicle being movable in any direction, obtaining movement direction information about a movement direction of the unmanned aerial vehicle, specifying a part to be processed in the image based on the movement direction information, performing detection processing on the part to be processed to detect a specific object, and controlling flight of the unmanned aerial vehicle based on a result of the detection processing.

A program according to the present invention causes a computer to function as image obtaining means for obtaining an image in which surroundings of an unmanned aerial vehicle are captured, the unmanned aerial vehicle being movable in any direction, movement direction obtaining means for obtaining movement direction information about a movement direction of the unmanned aerial vehicle, specifying means for specifying a part to be processed in the image based on the movement direction information, processing means for performing detection processing on the part to be processed to detect a specific object, and flight control means for controlling flight of the unmanned aerial vehicle based on a result of the detection processing.

In one aspect of the present invention, the unmanned aerial vehicle control system further includes external force obtaining means for obtaining external force information about external force on the unmanned aerial vehicle, and the specifying means specifies the part to be processed further based on the external force information.

In one aspect of the present invention, the unmanned aerial vehicle control system further includes attitude obtaining means for obtaining attitude information about an attitude of the unmanned aerial vehicle, and the specifying means specifies the part to be processed further based on the attitude information.

In one aspect of the present invention, the unmanned aerial vehicle control system further includes movement velocity obtaining means for obtaining movement velocity information about movement velocity of the unmanned aerial vehicle, and the specifying means specifies the part to be processed further based on the movement velocity information.

In one aspect of the present invention, the unmanned aerial vehicle flies in either a first flight mode, in which the unmanned aerial vehicle automatically flies based on a predetermined flight path, or a second flight mode, in which the unmanned aerial vehicle flies under an operation of an operator. The unmanned aerial vehicle control system further includes flight mode obtaining means for obtaining flight mode information about a current flight mode of the unmanned aerial vehicle, and the specifying means specifies the part to be processed further based on the flight mode information.

In one aspect of the present invention, the unmanned aerial vehicle control system further includes altitude obtaining means for obtaining altitude information about an altitude of the unmanned aerial vehicle during flight, and the specifying means specifies the part to be processed further based on the altitude information.

In one aspect of the present invention, the unmanned aerial vehicle control system further includes ground surface obtaining means for obtaining ground surface information about a ground surface of an area in which the unmanned aerial vehicle flies, and the specifying means specifies the part to be processed further based on the ground surface information.

In one aspect of the present invention, the unmanned aerial vehicle automatically flies based on the predetermined flight path. The flight control means generates a substitute flight path in a case where the specific object is detected by the detection processing, and controls flight of the unmanned aerial vehicle based on the substitute flight path.

In one aspect of the present invention, in a case where the substitute flight path is generated, the specifying means specifies the part to be processed again based on the substitute flight path.

In one aspect of the present invention, the unmanned aerial vehicle control system further includes means for obtaining map data of an area in which the unmanned aerial vehicle flies, and the specifying means specifies the part to be processed further based on the map data.

In one aspect of the present invention, the unmanned aerial vehicle control system further includes distinguishing means for distinguish a sky part, in which sky is captured, from a ground part, in which ground is captured, in the image, and the specifying means specifies the part to be processed in the ground part.

In one aspect of the present invention, in a case where the specific object is detected by the detection processing executed previously, the specifying means specifies the part to be processed further based on a part of the image in which the specific object is detected.

In one aspect of the present invention, the image is an image in which at least all horizontal directions are captured.

In one aspect of the present invention, the specific object is an object that the unmanned aerial vehicle should avoid.

In one aspect of the present invention, the processing means does not perform the detection processing on a part other than the part to be processed, and performs the detection processing only on the part to be processed.

In one aspect of the present invention, the processing means performs the detection processing on a part other than the part to be processed at a first frequency, and performs the detection processing on the part to be processed at a second frequency, which is higher than the first frequency.

Effects of the Invention

According to one or more embodiments of the present invention, it is possible to quickly detect a specific object to improve safety of flight.

BRIEF DESCRIPTION OF THE DRAWINGS

FIG. 7 is a diagram illustrating how to set a part to be processed;
FIG. 8 is a diagram illustrating how to set a part to be processed;
FIG. 13 is a diagram illustrating how to set a part to be processed P in variation (2);
FIG. 14 is a diagram illustrating how to set a part to be processed P in variation (3);
FIG. 15 is a diagram illustrating how to set a part to be processed P in variation (4);
FIG. 16 is a diagram illustrating how to set a part to be processed P in variation (5)

DESCRIPTION OF EMBODIMENTS

[1. Overall Configuration of Unmanned Aerial Vehicle Control System]

An example of an embodiment of an unmanned aerial vehicle control system according to the present invention will be described below. In this embodiment, a case will be described in which one unmanned aerial vehicle is included in the unmanned aerial vehicle control system, although the unmanned aerial vehicle control system may include a plurality of unmanned aerial vehicles, or other computers. Other computers may include, for example, a personal computer, a tablet terminal, a mobile phone such as a smartphone, and a server computer.

Figure 1:
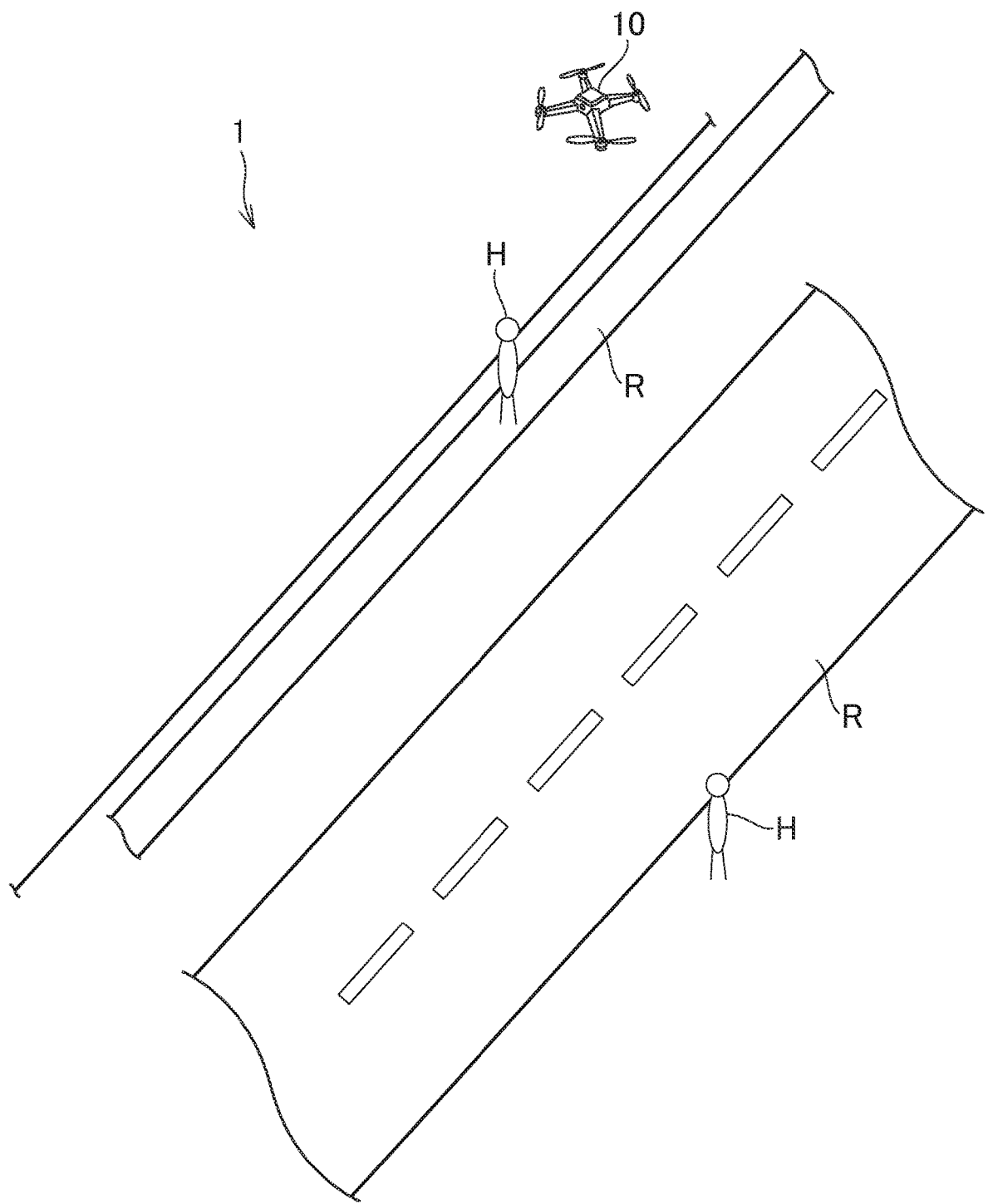
FIG. 1 is a diagram illustrating a flying unmanned aerial vehicle.

FIG. 1 is a diagram illustrating a flying unmanned aerial vehicle. For example, an unmanned aerial vehicle 10 included in the unmanned aerial vehicle control system 1 automatically flies on a predetermined path, and, as shown in FIG. 1, flies over an area in which a person H and a road R are present.

The unmanned aerial vehicle 10 is an aircraft on which a person does not board, such as an unmanned aerial vehicle driven by a battery (what is called "drone") and an unmanned aerial vehicle driven by an engine. For example, the unmanned aerial vehicle may carry a load such as goods or mail, and flies to a delivery address to deliver a package, or to a pickup address to collect a package. For example, the unmanned aerial vehicle may fly not particularly for carrying a package, but for obtaining information of a flight destination.

The unmanned aerial vehicle 10 is movable not only in the forward direction, but any of up-down, left-right, and forward-back directions. That is, the unmanned aerial vehicle is movable in a direction that is different from the forward direction by a predetermined angle (e.g., 90 degrees) or more, for example, movable in any direction in 360 degrees in the horizontal direction and the vertical direction. In other words, when three axes (e.g., roll axis, pitch axis, yaw axis in FIG. 5 described later) are set with the unmanned aerial vehicle 10 as the origin, the unmanned aerial vehicle 10 is movable in any direction of three-dimensional vectors.

Figure 2:
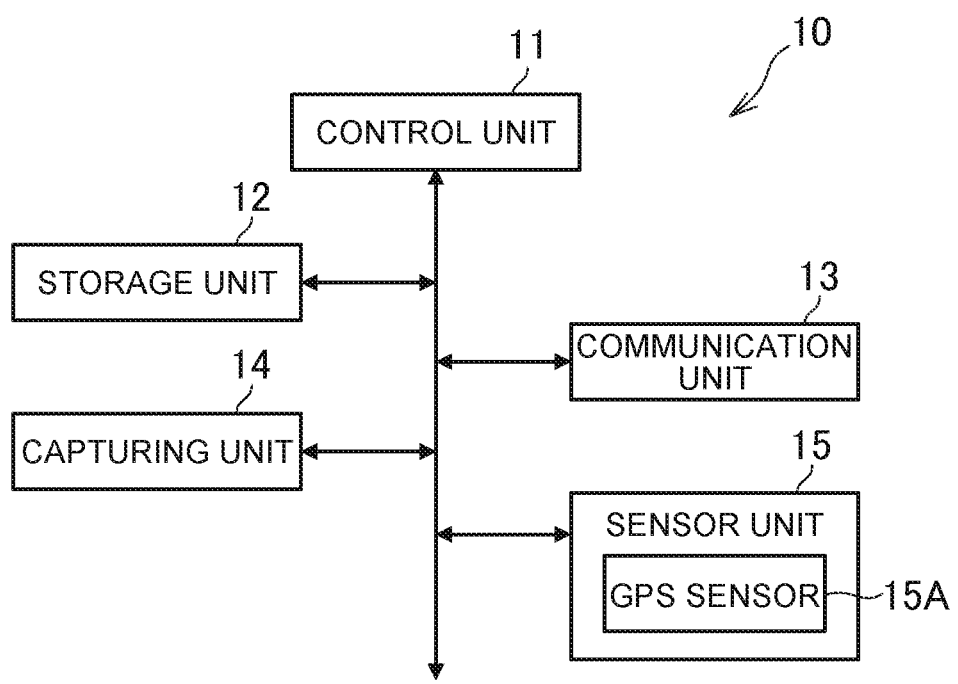
FIG. 2 is a diagram illustrating a hardware configuration of an unmanned aerial vehicle.

FIG. 2 is a diagram illustrating a hardware configuration of the unmanned aerial vehicle 10. As shown in FIG. 2, the unmanned aerial vehicle 10 includes a control unit 11, a storage unit 12, a communication unit 13, a capturing unit 14, and a sensor unit 15. The unmanned aerial vehicle 10 also includes, for example, propellers, a motor, and a battery, which are omitted here.

The control unit 11 includes, for example, at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 includes a wired or wireless communication interface. The communication unit 13 sends and receives data through a network.

The capturing unit 14 is at least one camera. The capturing unit 14 includes an image pickup element, such as a CMOS image sensor and a CCD image sensor, and stores images captured by the image pickup element as digital data. The image may be a still image, or video captured successively at a predetermined frame rate. The capturing unit 14 may be provided with a wide-angle lens or a fisheye lens, and have any value of a field angle and a focal distance.

The capturing unit 14 may be a spherical camera (omni-directional camera), or may include a plurality of cameras having different capturing directions for wide-range capturing of images. The capturing unit 14 may be a thermography camera, or an infrared camera. As such, images may indicate heat distribution, or flight time of infrared rays.

The sensor unit 15 includes, for example, a GPS sensor 15A. The GPS sensor 15A includes a receiver for receiving a signal from a satellite, and detects position information based on the signal received by the receiver, for example. The unmanned aerial vehicle 10 may include any sensor, and the sensor unit 15 may include any sensor, such as an infrared ray sensor, an audio sensor (microphone), an acceleration sensor, a gyro sensor, a wind sensor, a magnetic field sensor, an altitude sensor, a displacement sensor, a pressure sensor, and a temperature sensor.

The hardware configuration of the unmanned aerial vehicle 10 is not limited to the example of FIG. 1, but various types of hardware may be employed. For example, the unmanned aerial vehicle 10 may include an input device, such as a touch panel and a button, and a liquid crystal display or an organic EL display. For example, the unmanned aerial vehicle 10 may include a reader (e.g., memory card slot, optical disc drive) for reading a computer-readable information storage medium, and an input/output unit (e.g., USB port) for communicating with external devices. The programs and data described as being stored in the storage unit 12 may be provided through the reader or the input/output unit, or a network.

[2. Overview of Unmanned Aerial Vehicle Control System]

In this embodiment, the unmanned aerial vehicle 10 analyzes an image captured by the capturing unit 14, and controls its flight based on a specific object detected in the image. The object is a substance on the ground or in the space, and a subject to be captured by the capturing unit 14. The object may be a still object, or a moving object. The specific object is an object to be a reference of the flight control, and may indicate an object that the unmanned aerial vehicle 10 should avoid, or an object that the unmanned aerial vehicle 10 should approach.

The object that the unmanned aerial vehicle 10 should avoid is an object that the unmanned aerial vehicle 10 should not approach within a predetermined distance (e.g., 30 meters) (i.e., an object from which the unmanned aerial vehicle 10 should be away more than a predetermined distance), or an object that the unmanned aerial vehicle 10 should not land or touch. The object that the unmanned aerial vehicle 10 should approach is an object that the unmanned aerial vehicle 10 should be within a predetermined distance, an object on a destination or a route point of the unmanned aerial vehicle 10, or an object that the unmanned aerial vehicle 10 should land or touch.

In this embodiment, the specific object is an object that the unmanned aerial vehicle 10 should avoid, for example, animals such as a person and a bird, buildings such as a multistoried building, a private house, and a factory, or machines such as an automobile, a motorcycle, and other aircraft. These are only some of the examples of the specific object, and the specific object may be any predetermined object. For example, the unmanned aerial vehicle 10 analyzes an image captured by the capturing unit 14, and determines whether a specific object is detected.

Figure 3:
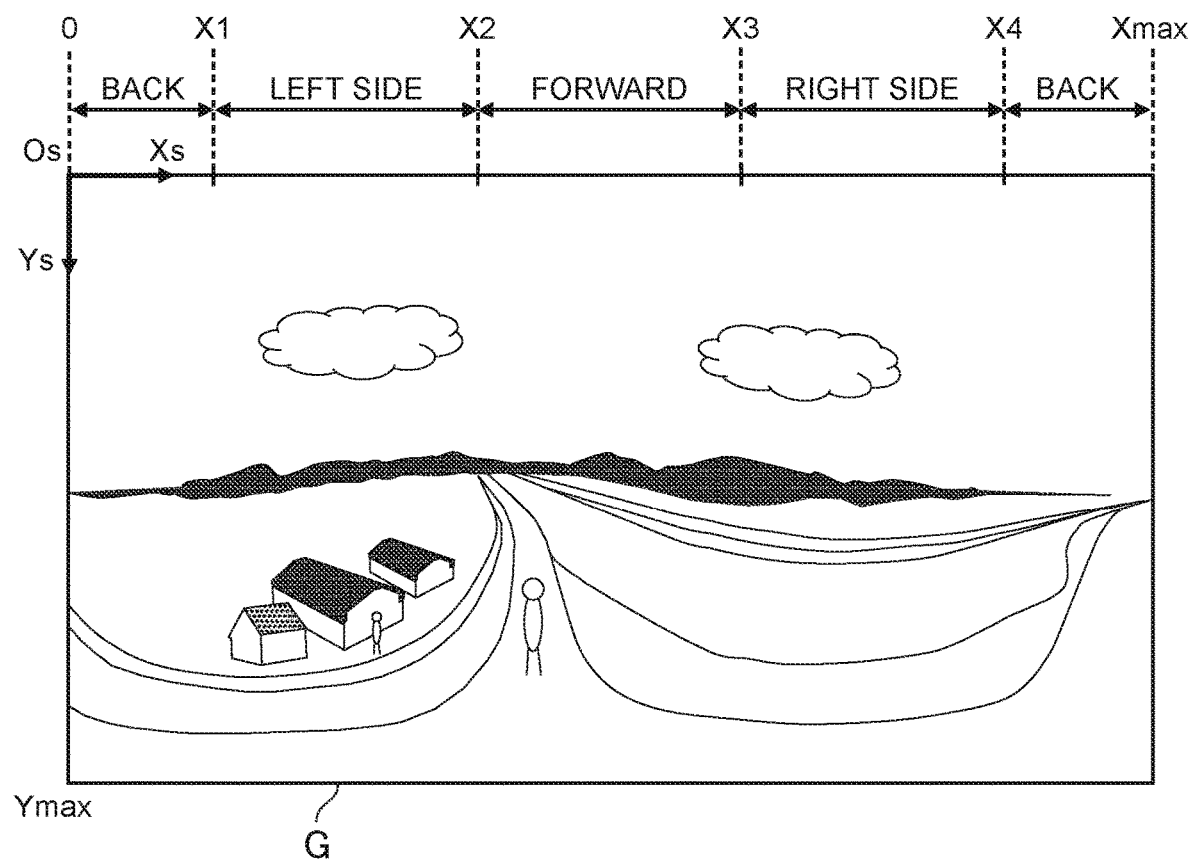
FIG. 3 is a diagram illustrating an image captured by a capturing unit.

FIG. 3 is a diagram illustrating an image captured by the capturing unit 14. In this embodiment, two-dimensional coordinates (Xs axis-Ys axis) is set to have an origin Os on the top left of an image G, and a position in the image G is specified by the two-dimensional coordinates. Here, the Xs coordinate value on the right edge of the image G is Xmax, and the Ys coordinate value on the lower edge of the image G is Ymax.

As shown in FIG. 3, the image G of this embodiment is a panorama image of the surroundings of the unmanned aerial vehicle 10 in 360 degrees. For example, a scene in the forward direction of the unmanned aerial vehicle 10 is captured in an area of the image G from X2 to X3 of the Xs coordinate values. The forward direction may be a predetermined reference direction of the unmanned aerial vehicle 10, for example, a direction of the roll axis (FIG. 5) described later.

For example, a scene in the left side (the left side to the forward direction) of the unmanned aerial vehicle 10 is captured in an area of the image G from X1 to X2 of the Xs coordinate values. For example, a scene in the right side (the right side to the forward direction) of the unmanned aerial vehicle 10 is captured in an area from X3 to X4 of the Xs coordinate values. For example, a scene in the back side (the back side of the forward direction) of the unmanned aerial vehicle 10 is captured in areas from X0 to X1 and X4 to Xmax of the Xs coordinate values.

As shown in FIG. 3, the image G shows a wide range of the environment. If the processing of detecting a specific object is performed on the entire image G, a range of the detection is wide, and thus a longer time is needed for the processing. This results in delay in detecting the specific object.

In this regard, the moving direction side of the unmanned aerial vehicle 10 is important in the surroundings of the unmanned aerial vehicle 10, because the unmanned aerial vehicle 10 is approaching such side. For example, the opposite side of the moving direction side of the unmanned aerial vehicle 10 is not so important because the unmanned aerial vehicle 10 is moving away. As described, the unmanned aerial vehicle 10 is movable not only in the forward direction but in any direction, and thus an important part of the image G changes according to the circumstances.

As such, the unmanned aerial vehicle control system 1 in this embodiment specifies a part in which the moving direction side of the unmanned aerial vehicle 10 is captured in the image G, and performs the processing of detecting a specific object in the part. A target part of the processing is thus limited to the important part, and a specific object can be thereby quickly detected to improve safety of flight. The details of the technique will be described below.

[3. Functions Implemented in Unmanned Aerial Vehicle Control System]

Figure 4:
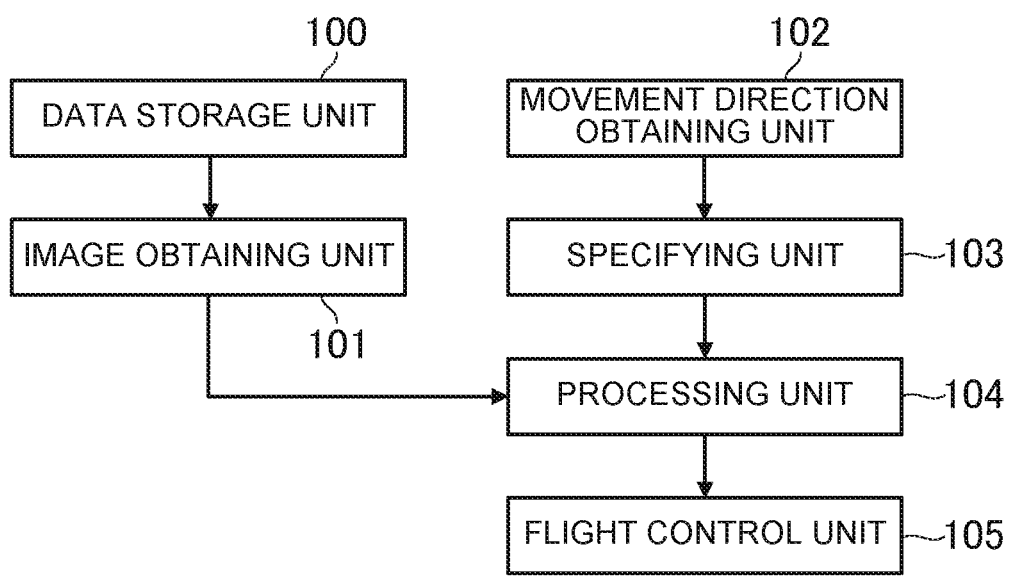
FIG. 4 is a functional block diagram showing an example of functions implemented in the unmanned aerial vehicle control system.

FIG. 4 is a functional block diagram showing an example of functions implemented in the unmanned aerial vehicle control system 1. As shown in FIG. 4, a data storage unit 100, an image obtaining unit 101, a movement direction obtaining unit 102, a specifying unit 103, a processing unit 104, and a flight control unit 105 are implemented in the unmanned aerial vehicle control system 1. In this embodiment, a case will be described in which these functions are implemented in the unmanned aerial vehicle 10.

[3-1. Data Storage Unit]

The data storage unit 100 is implemented mainly by the storage unit 12. The data storage unit 100 stores data necessary for flight control of the unmanned aerial vehicle 10. For example, the data storage unit 100 stores object data for detecting a specific object.

The object data stores features of specific objects, and defines shape features of specific objects, for example. The shape feature is, for example, indicated by feature points and contour lines extracted from the image G. In this embodiment, animals, buildings, and machines are examples of a specific object, and thus the object data stores basic shapes of the animals, buildings, and machines. In addition to the shapes, the object data may define features of color, pattern, and size, for example.

For example, the data storage unit 100 may store data indicating relationship between positions in the image G and directions viewed from the unmanned aerial vehicle 10. For example, if the unmanned aerial vehicle 10 automatically flies based on a predetermined flight route, the data storage unit 100 may store data relating to the flight route. In this case, the unmanned aerial vehicle 10 compares position information of the unmanned aerial vehicle 10 detected by the GPS sensor 15A with the flight route, and controls its flight so as to keep the difference between them less than a threshold value.

[3-2. Image Obtaining Unit]

The image obtaining unit 101 is implemented mainly by the control unit 11. The image obtaining unit 101 obtains the image G in which the surroundings of the unmanned aerial vehicle 10 movable in any direction are captured. The image obtaining unit 101 obtains the image G captured by the capturing unit 14. The capturing unit 14 may not need to be incorporated in the unmanned aerial vehicle 10, but may be provided to the outside of the unmanned aerial vehicle 10, and the image obtaining unit 101 may obtain the image G through the communication unit 13 or the input/output unit.

For example, in a case where the capturing unit 14 repeatedly captures images based on the predetermined frame rate, the image obtaining unit 101 obtains an image G every time a predetermined period of time elapses. The frame rate may not particularly be determined in the capturing unit 14. In this case, the image obtaining unit 101 irregularly obtains the image G.

In this embodiment, the image G is an image in which at least all horizontal directions are captured, and covers 360 degrees horizontally. In this regard, however, all horizontal directions may not need to be captured, but the surroundings in a predetermined angle (e.g., any angle of 90 degrees or more and 360 degrees or less) may be captured. Similarly, all vertical directions may not need to be captured, but the surroundings in a predetermined angle (e.g., any angle of 90 degrees or more and 360 degrees or less) may be captured.

For example, the image obtaining unit 101 may not obtain all directions in 360 degrees, but may obtain the image G captured by the capturing unit 14 having a wide-angle lens (so-called wide-angle camera). In this case, for example, the image obtaining unit 101 may obtain image G captured by the capturing unit 14, which is directed only to the forward direction of the unmanned aerial vehicle 10, and the specifying unit 103 described later specifies a part to be processed in the image G that does not cover 360 degrees.

For example, the image G may be in any data format, such as JPG, BMP, GIF, AVI, and MPEG formats. Further, the image G may not have a rectangular shape shown as in FIG. 3, but have a square shape. For example, in a case where the capturing unit 14 includes a plurality of cameras, the image obtaining unit 101 may obtains an image G from each camera to obtain a plurality of images G capturing different directions. In this case, the surroundings in the predetermined angle (e.g., any angle of 90 degrees or more and 360 degrees or less) described above may be captured in the whole of the plurality of images G, and each image G may capture surroundings in a range of several tens of degrees. For example, the image obtaining unit 101 may store the history of the images G captured by the capturing unit 14 in the data storage unit 100.

[3-3. Movement Direction Obtaining Unit]

The movement direction obtaining unit 102 is implemented mainly by the control unit 11. The movement direction obtaining unit 102 obtains movement direction information regarding movement directions of the unmanned aerial vehicle 10. For example, the movement direction obtaining unit 102 obtains the movement direction information based on a change in the image G or a detection result of the sensor unit 15.

The movement direction information may be represented in a two-dimensional direction or a three-dimensional direction, or in the two-dimensional coordinates in the image G. For example, the movement direction information is represented in vectors or compass directions. The two-dimensional direction only includes a horizontal direction, and the three-dimensional direction includes not only a horizontal direction but also a vertical direction. In a case where the movement direction is represented in vectors, two-dimensional or three-dimensional vectors may be used. In a case where the movement direction is represented in compass directions, any method such as 360 degree system, 90 degree system, and dot pattern may be used.

Figure 5:
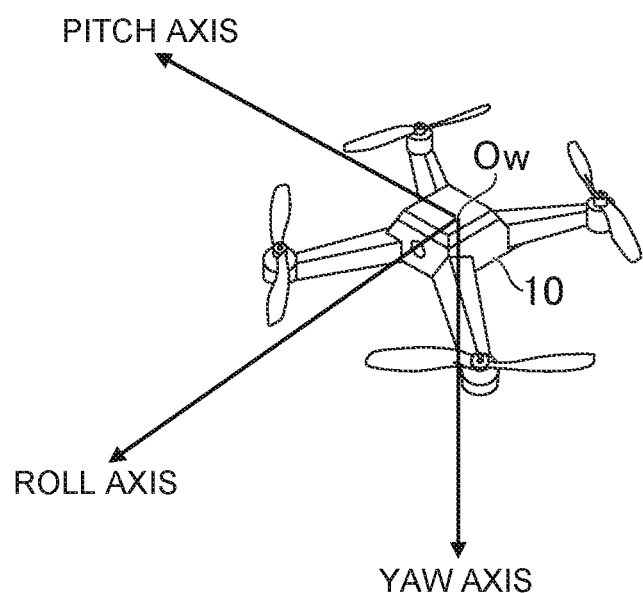
FIG. 5 is a diagram for explaining movement direction information.

FIG. 5 is a diagram for explaining the movement direction information. As shown in FIG. 5, in this embodiment, a predetermined position in the unmanned aerial vehicle 10 (e.g., center of gravity) is set as the origin Ow, and three axes of a roll axis, a pitch axis, and a yaw axis are determined. The roll axis indicates the forward-back direction, the pitch axis indicates the horizontal direction, and the yaw axis indicates the vertical direction. For example, the movement direction information is indicated by three-dimensional vectors in three-dimensional space defined by these three axes. The three axes may be set in any direction viewed from the unmanned aerial vehicle 10. For example, the roll axis may be set in the direction in the center of the image G (capturing direction), and the pitch axis and the yaw axis may be set so as to be perpendicular to the roll axis.

For example, in a case where the movement direction obtaining unit 102 obtains the movement direction information based on a change in the image G, the relationship between the change in the image G and the movement direction information may be stored in the data storage unit 100 as data in program format, or numerical or table format. That is, such relationship may be defined in a portion of a program code, or in a numerical format or a table format.

The movement direction obtaining unit 102 obtains the movement direction information associated with the changes in the image G.

For example, relationship between changes in positions of feature points in the image G and the movement direction information may be defined. The movement direction obtaining unit 102 extracts a plurality of feature points each time an image G is obtained, and obtains movement direction information based on a movement direction of each feature point. For example, the movement direction obtaining unit 102 extracts a plurality of feature points in an area of the image G in which the forward direction of the unmanned aerial vehicle 10 is captured (in the example of FIG. 3, the area between Xs coordinate values of X2 to X3), and obtains movement direction information based on a movement direction of each feature point.

For example, if the feature points move downward, the movement direction obtaining unit 102 determines that the unmanned aerial vehicle moves in the forward direction (positive roll axis direction), and if the feature points move upward, the movement direction obtaining unit 102 determines that the unmanned aerial vehicle 10 moves back (negative roll axis direction). For example, if the feature points move leftward, the movement direction obtaining unit 102 determines that the unmanned aerial vehicle moves in the right direction (positive pitch axis direction), and if the feature points move rightward, the movement direction obtaining unit 102 determines that the unmanned aerial vehicle 10 moves in the left direction (negative pitch axis direction).

For example, in a case where the movement direction obtaining unit 102 obtains the movement direction information based on the detection result of the sensor unit 15, the relationship between the detection result of the sensor unit 15 and the movement direction information may be stored in the data storage unit 100 as data in program format, or numerical or table format. That is, such relationship may be defined in a portion of a program code, or in a numerical format or a table format. The movement direction obtaining unit 102 obtains the movement direction information associated with the detection result of the sensor unit 15.

For example, the movement direction obtaining unit 102 may obtain the movement direction information based on the detection result of the GPS sensor 15A. In this case, the movement direction obtaining unit 102 obtains the movement direction information based on changes in position information (latitude/longitude information) detected by the GPS sensor 15A. For example, the movement direction obtaining unit 102 may obtain movement direction information corresponding to the current position based on the position information detected by the GPS sensor 15A and a flight route of the unmanned aerial vehicle 10. For example, the movement direction obtaining unit 102 may obtain the movement direction information based on the detection result of the accelerometer of the sensor unit 15. In this case, the movement direction obtaining unit 102 obtains the movement direction based on changes in acceleration detected by the accelerometer.

The method of obtaining the movement direction information is not limited to the above example. The method of obtaining the movement direction information may use various known methods. For example, the unmanned aerial vehicle 10 moves in a direction in which the number of rotations of propellers is relatively small, and thus the movement direction obtaining unit 102 may obtain the movement direction information based on differences between numbers of rotations detected by motor encoders attached to respective motors, or based on differences between output voltages to the respective motors.

[3-4. Specifying Unit]

The specifying unit 103 is implemented mainly by the control unit 11. The specifying unit 103 specifies a part to be processed in the image G based on the movement direction information. The part to be processed is a part of the image G on which detection processing of a specific object is performed, or a part on which the detection processing is preferentially performed. "Preferentially" means that frequency of performing the detection processing is high, time interval between the detection processing is short, or the number of performing the detection processing is large. The number of a part to be processed may be one, or two or more.

In this embodiment, a case will be described in which a part to be processed has a rectangular shape in a predetermined size, although the part to be processed may have any shape and size. For example, the part to be processed may be a circle, a triangle, a quadrangle such as a square and a trapezoid, and a polygon having a pentagonal shape or more. For example, a shape and a size of the part to be processed may not be fixed, but may be variable depending on a position of the part to be processed in the image G, performance of the unmanned aerial vehicle 10, a flight mode, weather, and a flight area.

The specifying unit 103 determines at least one of a position (position in the image G), shape, and size of the part to be processed based on the movement direction information. In this embodiment, a shape and a size of the part to be processed are fixed for simplicity, and the specifying unit 103 determines a position of the part to be processed based on the movement direction information, although a shape and a size of the part to be processed may be variable.

The relationship between the movement direction information and the part to be processed may be stored in the data storage unit 100 as data in program format, or numerical or table format. That is, such relationship may be defined in a portion of a program code, or in a numerical format or a table format. The specifying unit 103 sets the part to be processed associated with the movement direction information. For example, the specifying unit 103 sets the part to be processed so as to include a position associated with the movement direction information.

Figure 6:
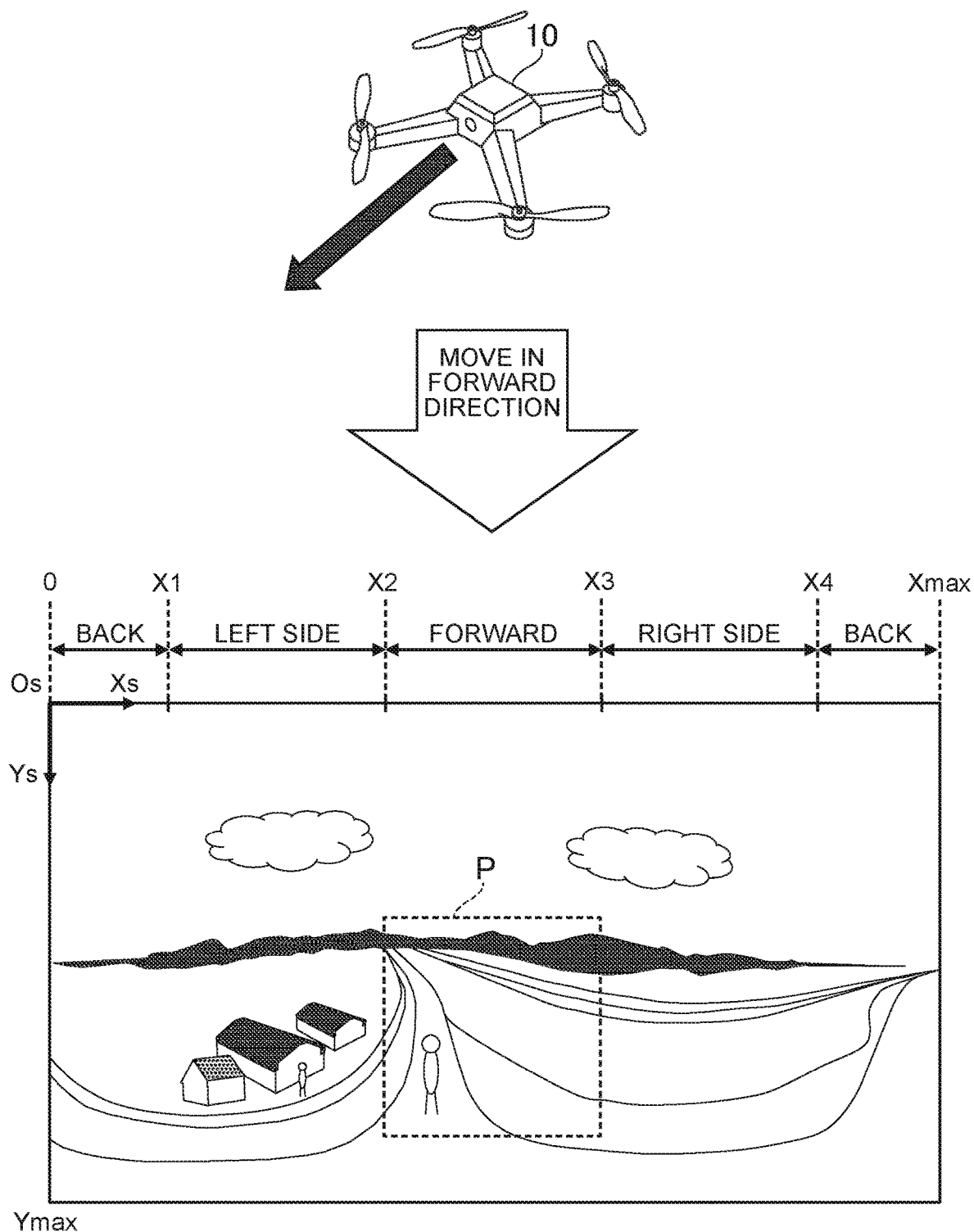
FIG. 6 is a diagram illustrating how to set a part to be processed.

FIGS. 6 to 9 are diagrams illustrating how to set a part to be processed. As shown in FIG. 6, for example, if the unmanned aerial vehicle 10 moves in the forward direction (positive roll axis direction), the specifying unit 103 sets a part to be processed P in the area having Xs coordinate values of from X2 to X3 in the image G where the forward direction of the unmanned aerial vehicle 10 is captured. For example, as shown in FIG. 7, if the unmanned aerial vehicle 10 moves back (negative roll axis direction), the specifying unit 103 sets a part to be processed P in the area having Xs coordinate values of from 0 to X1 in the image G where the back of the unmanned aerial vehicle 10 is captured.

Figure 9:
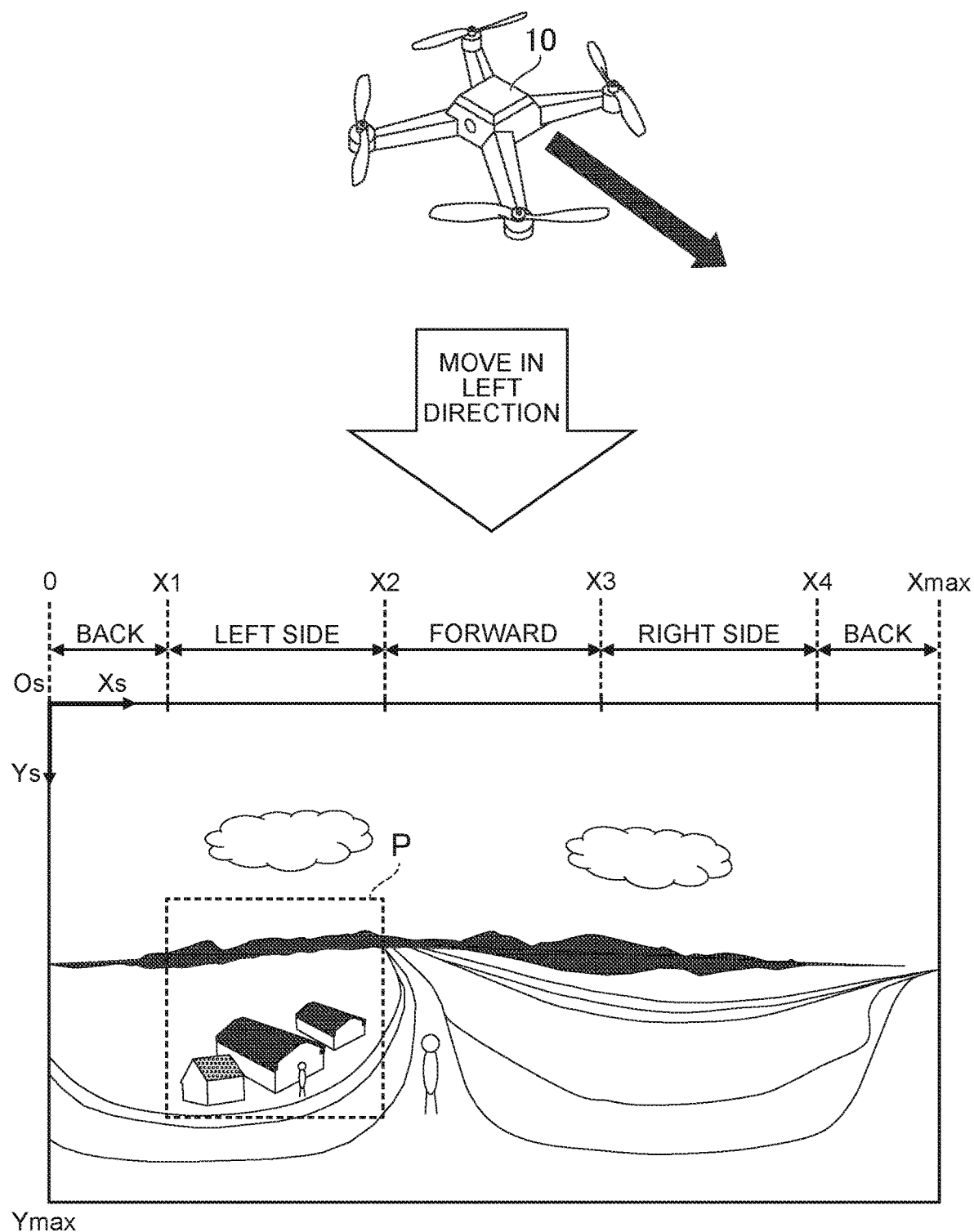
FIG. 9 is a diagram illustrating how to set a part to be processed.

As shown in FIG. 8, for example, if the unmanned aerial vehicle 10 moves in the right direction (positive pitch axis direction), the specifying unit 103 sets a part to be processed P in the area having Xs coordinate values of from X3 to X4 in the image G where the right direction of the unmanned aerial vehicle 10 is captured. As shown in FIG. 9, for example, if the unmanned aerial vehicle 10 moves in the left direction (negative pitch axis direction), the specifying unit 103 sets a part to be processed P in the area having Xs coordinate values of from X1 to X2 in the image G where the left direction of the unmanned aerial vehicle 10 is captured.

In FIGS. 6 to 9, the case has been described in which the unmanned aerial vehicle 10 moves in forward-back or left-right direction. In a case where the unmanned aerial vehicle 10 flies therebetween, the specifying unit 103 may set a part to be processed P in an area where the movement direction side of the unmanned aerial vehicle 10 at the time is captured. For example, if the unmanned aerial vehicle 10 moves in the obliquely right direction to the forward direction, the specifying unit 103 may set a part to be processed P in an area where a scene obliquely right forward of the unmanned aerial vehicle 10 is captured, and if the unmanned aerial vehicle 10 moves in the obliquely left direction to the forward direction, the specifying unit 103 may set a part to be processed P where a scene obliquely left forward of the unmanned aerial vehicle 10 is captured.

For example, the specifying unit 103 may set a part to be processed P in view of not only a horizontal direction but also a vertical direction of the movement direction. For example, if the unmanned aerial vehicle 10 moves slightly upward to the forward direction, the specifying unit 103 may set a part to be processed P at a position slightly above the position described in FIG. 6. For example, if the unmanned aerial vehicle 10 moves slightly downward to the forward direction, the specifying unit 103 may set a part to be processed P at a position slightly below the position described in FIG. 6. The part to be processed P may be set similarly in the other movement directions.

For example, the specifying unit 103 may divide the image G in a plurality of small areas in advance, and associate each area with a movement direction. The small areas may be divided in a grid pattern, or have any shape such as a circle. In this case, the specifying unit 103 specifies an area associated with the movement direction indicated by the movement direction information as a part to be processed P. Further, the specifying unit 103 may calculate a priority of each small area based on the movement direction information, and specify a small area having a priority of a threshold value or more as a part to be processed P. The specifying unit 103 may calculate a priority of each small area such that a priority of a small area on the movement direction side of the unmanned aerial vehicle 10 is higher.

[3-5. Processing Unit]

The processing unit 104 is implemented mainly by the control unit 11. The processing unit 104 performs the detection processing on the part to be processed P for detecting a specific object. In this embodiment, for simplicity, the processing unit 104 does not perform the detection processing on an area other than the part to be processed P, but performs the detection processing only on the part to be processed P.

The processing unit 104 determines whether a specific object is captured in a part to be processed P based on the part to be processed P in the image G and the object data. The method of detecting a specific object may use various known object detecting methods. For example, an object detection algorithm based on deep learning (e.g., an algorithm using CNN (Convolutional Neural Networks)) or a pattern matching method may be used.

For example, the processing unit 104 calculates similarity between an object captured in the part to be processed P and a basic shape defined in the object data. If the similarity is a reference value or more, the processing unit 104 determines that a specific object is captured in the part to be processed P. The processing unit 104 may calculate similarity of each area in the part to be processed P such that an area having a smaller shape difference from the basic shape has higher similarity.

[3-6. Flight Control Unit]

The flight control unit 105 is implemented mainly by the control unit 11. The flight control unit 105 controls flight of the unmanned aerial vehicle 10 based on the result of the detection processing. In this embodiment, a specific object should be avoided by the unmanned aerial vehicle 10, and thus, when a specific object is detected, the flight control unit 105 controls the flight of the unmanned aerial vehicle 10 to avoid the specific object.

The relationship between the result of the detection processing and the flight control method may be stored in the data storage unit 100 as data in program format, or numerical or table format. That is, such relationship may be defined in a portion of a program code, or in a numerical format or a table format.

The flight control method is a method of controlling at least one of a movement direction, movement velocity, and attitude of the unmanned aerial vehicle 10. The movement direction, movement velocity, and attitude of the unmanned aerial vehicle 10 are controllable by respective rotations of propellers of the unmanned aerial vehicle 10, and thus the flight control unit 105 controls the number of rotations and the direction of rotation of each propeller according to the flight control data. The number of rotations and the rotational direction of a propeller vary depending on a voltage to a motor that rotates the propeller. As such, it can be described that the flight control unit 105 determines a voltage to each motor based on the flight control data.

For example, the flight control unit 105 controls flight of the unmanned aerial vehicle 10 based on the flight control method associated with the result of the detection processing. For example, when a specific object is detected, the flight control unit 105 may change the flight route so as to be away from the specific object. For example, when a specific object is detected, the flight control unit 105 may control the movement direction of the unmanned aerial vehicle 10 so as to be away from the specific object. For example, when a specific object is detected, the flight control unit 105 may reduce the movement velocity. For example, when a specific object is detected, the flight control unit 105 may control the unmanned aerial vehicle 10 to hover so as to stay at the current location.

[4. Processing executed in unmanned aerial vehicle control System]

Figure 10:
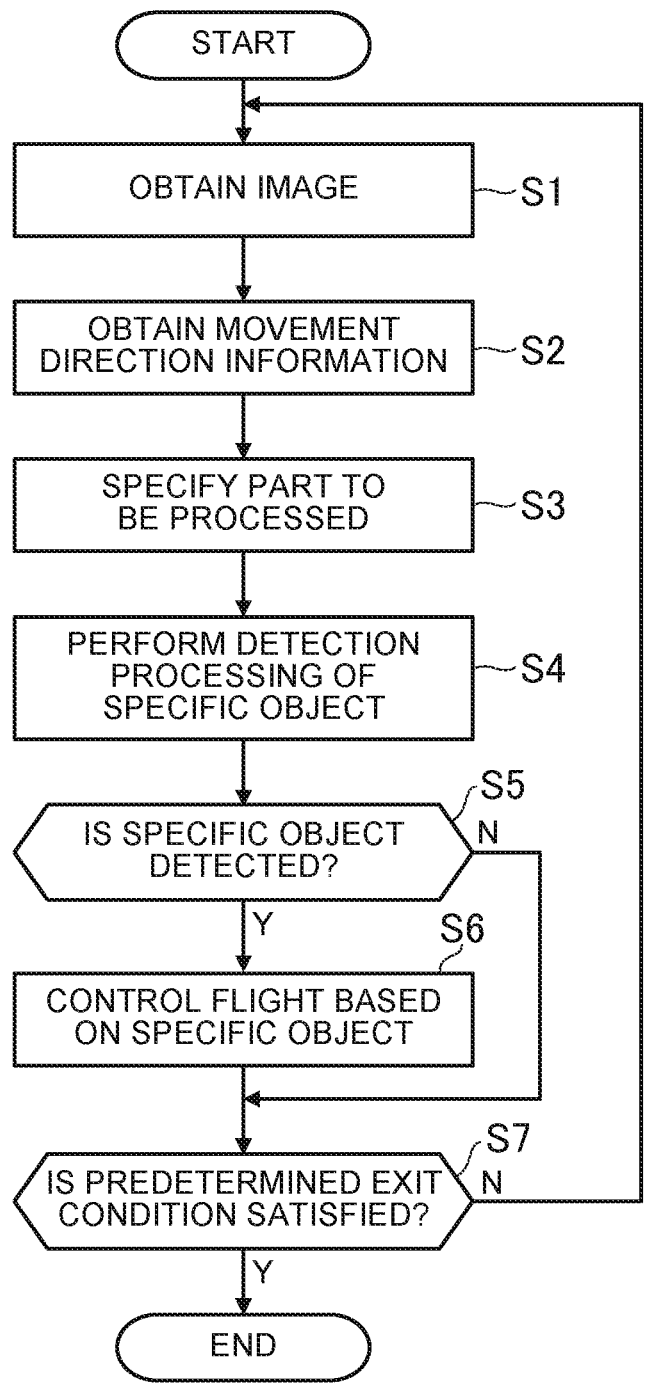
FIG. 10 is a flow chart showing an example of processing executed in the unmanned aerial vehicle control system.

FIG. 10 is a flow chart showing an example of processing executed in the unmanned aerial vehicle control system 1. In this embodiment, a case will be described in which the unmanned aerial vehicle 10 executes the processing shown in FIG. 10. For example, the processing shown in FIG. 10 is executed when the control unit 11 operates in accordance with the program stored in the storage unit 12. In this embodiment, the processing described below is an example of the processing executed by the functional block shown in FIG. 4, and may be performed at predetermined intervals.

As shown in FIG. 10, the control unit 11 obtains an image G captured by the capturing unit 14 (S1). In S1, the control unit 11 may obtain and store the image G in the storage unit 12. The image G may be stored in the storage unit 12 on a time-series basis, or stored in the storage unit 12 in association with the current time (the time at which the image G is obtained).

The control unit 11 obtains movement direction information of the unmanned aerial vehicle 10 (S2). In S2, as described above, the control unit 11 obtains the movement direction information based on a change in the image G or a detection result of the sensor unit 15, for example. In S2, the control unit 11 may obtain and store the movement direction information in the storage unit 12. The movement direction information may be stored in the storage unit 12 on a time-series basis, or stored in the storage unit 12 in association with the current time (the time at which movement direction information is obtained).

The control unit 11 specifies a part to be processed P in the image G obtained in S1 based on the movement direction information obtained in S2 (S3). In S3, the control unit 11 sets the part to be processed P in an area of the image G corresponding to the movement direction indicated by the movement direction information. The two-dimensional coordinates indicating the position of the part to be processed P are stored in the storage unit 12.

The control unit 11 performs the detection processing of a specific object on the part to be processed P in the image G specified in S3 (S4). That is, in the example of processing in FIG. 10, the control unit 11 does not perform the detection processing on a part other than the part to be processed P. In S4, the control unit 11 calculates similarity between the object in the part to be processed P and a basic shape of the specific object defined in the object data.

The control unit 11 determines whether a specific object is detected based on the processing result in S4 (S5). In S5, the control unit 11 determines whether a part having the similarity calculated in S4 equal to or more than the reference value is included in the part to be processed P. If there is a part having the similarity equal to or more than the reference value, it is determined that a specific object is detected.

If it is determined that a specific object is detected (S5;Y), the control unit 11 controls the flight of the unmanned aerial vehicle 10 based on the specific object (S6). In S6, the control unit 11 controls flight so as to avoid the specific object. For example, the control unit 11 specifies a position of the specific object relative to the unmanned aerial vehicle 10 based on the position of the specific object in the image G or the position of the part to be processed P. Subsequently, the control unit 11 moves the unmanned aerial vehicle 10 in a direction away from such a position.

The control unit 11 determines whether a predetermined exit condition is satisfied (S7). The exit condition may be any condition determined for terminating this processing, such as, a condition that the unmanned aerial vehicle 10 arrives at a destination, or a condition that the unmanned aerial vehicle 10 makes a landing. If it is not determined that the exit condition is satisfied (S7;N), the processing returns to S1. If it is determined that the exit condition is satisfied (S7;Y), the processing terminates.

According to the unmanned aerial vehicle control system 1 described above, the detection processing is not performed on all of the image G but performed on a part to be processed P, which is highly important in the image G, and thus the specific object can be quickly detected to improve safety of flight. For a part to be processed P that is not so important, the detection processing is not performed or the frequency of the detection processing is reduced. This can reduce the processing load on the unmanned aerial vehicle control system 1 and increase the processing speed. Even if the image G is not an omnidirectional image of 360 degrees, when a wide range of view is captured in the image by a wide-angle lens, an area to be processed is wider. In this case as well, a part to be processed P is set in the image G, and a specific object can be thereby quickly detected to increase safety of flight.

In a case of an image G in which views in all horizontal directions are captured, especially wider range of views is captured. In this case as well, the detection processing is performed on a part to be processed P that is important in the image G, and a specific object can be thereby detected quickly to increase safety of flight.

If a specific object that the unmanned aerial vehicle 10 should avoid is detected, the unmanned aerial vehicle 10 can be controlled to fly so as to avoid the specific object. This can effectively improve safety of flight.

The detection processing is not performed on a part other than a part to be processed P in the image G, but performed only on a part to be processed P. Specifically, the detection processing is performed only on a part to be processed P that is particularly important. This serves to quickly detect a specific object and improve safety of flight. The detection processing is not performed on a part to be processed P that is not so important. This can reduce the processing load on the unmanned aerial vehicle control system 1 and increase the processing speed.

[5. Variations]

The present invention is not to be limited to the above described embodiment. The present invention can be changed as appropriate without departing from the spirit of the invention.

Figure 11:
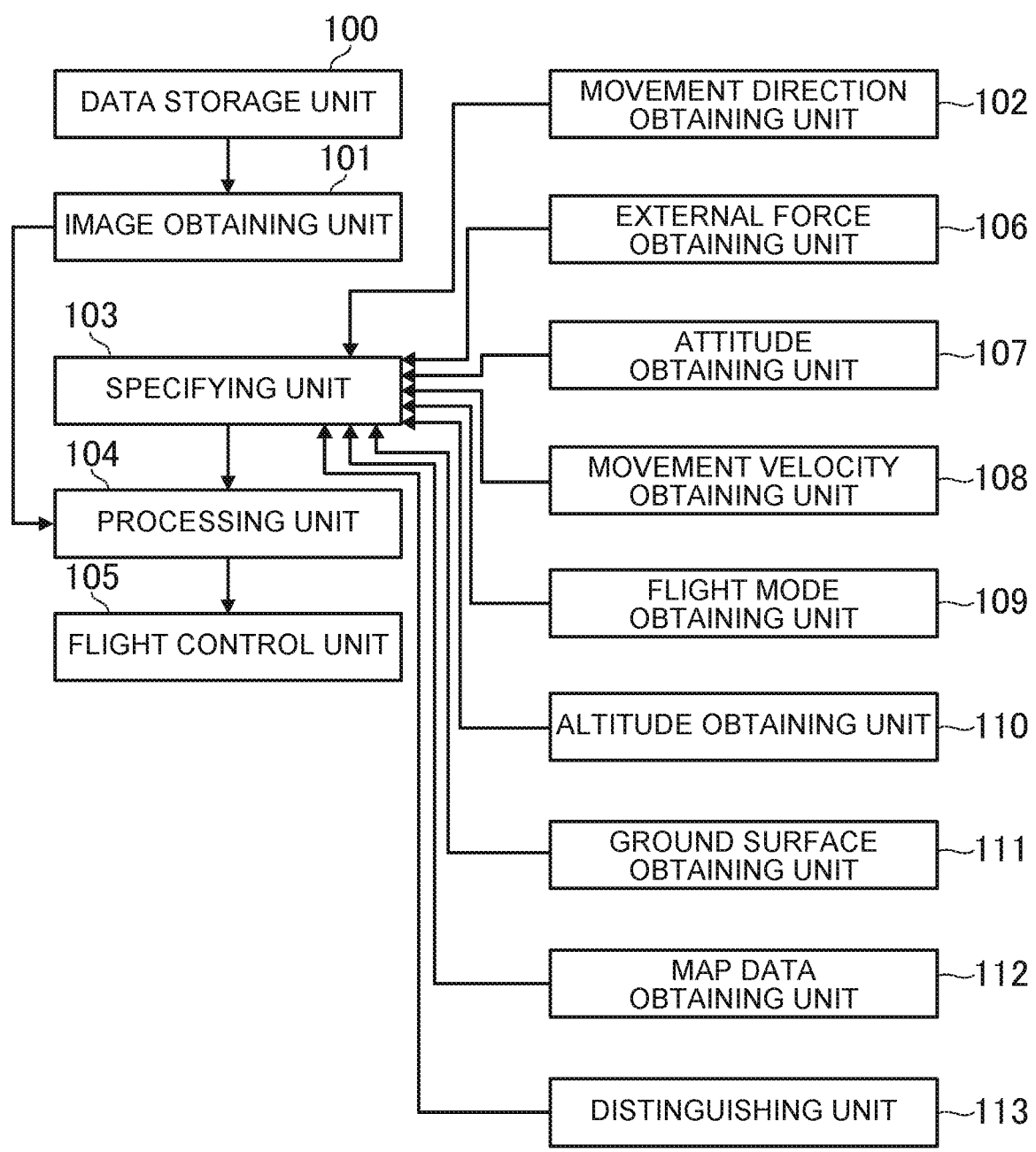
FIG. 11 is a functional block diagram of a variation.

FIG. 11 is a functional block diagram of a variation. As shown in FIG. 11, in the variation, an external force obtaining unit 106, an attitude obtaining unit 107, a movement velocity obtaining unit 108, a flight mode obtaining unit 109, an altitude obtaining unit 110, a ground surface obtaining unit 111, a map data obtaining unit 112, and a distinguishing unit 113 are implemented in addition to the functions described in the embodiment. These functions are implemented mainly by the control unit 11.

(1) For example, when the unmanned aerial vehicle 10 receives wind, the movement direction may be changed and the unmanned aerial vehicle 10 may move in an unintended direction. As such, not only the movement direction information but also external force information may be considered to specify a part to be processed P. The unmanned aerial vehicle control system 1 in variation (1) includes the external force obtaining unit 106. The external force obtaining unit 106 obtains external force information about external force on the unmanned aerial vehicle 10.

The external force information includes at least one of strength of the external force and a direction of the external force. The external force on the unmanned aerial vehicle 10 is exerted by the wind, and thus the strength of the external force may be represented by strength of the wind, or strength of the force in view of the surface area of the unmanned aerial vehicle 10. The strength of the wind is represented by any index, such as wind speed, wind power, wind pressure, and airflow volume. The direction of the external force may be indicated by a wind direction, or a direction of the force in view of the shape of the surface of the unmanned aerial vehicle 10.

The strength of the external force is represented by a value indicating the external force itself, or a symbol indicating an extent of the external force. If the external force is represented by symbols, meaning of each symbol may be determined in advance, for example, A means windless, B means breeze, and C means strong wind. For example, the direction of the external force may be represented in a two-dimensional direction, or a three-dimensional direction, and is represented in a vector or a compass direction.

The external force obtaining unit 106 obtains the external force information based on a change in the image G or a detection result of the sensor unit 15. For example, the external force obtaining unit 106 obtains the wind speed and the wind direction detected by the wind sensor of the sensor unit 15 as the external force information. The wind sensor is a digital anemometer (electronic anemometer) and includes a temperature sensor and a pressure sensor, and detects changes in the temperature and the pressure due to wind, thereby detecting the wind speed and the wind direction.

The external force information needs not to be detected by the wind sensor of the sensor unit 15, and the method of obtaining the external force information may employ various known methods. For example, the external force information may be detected based on a change in the image G. In this case, the external force information may be obtained based on a difference between the modeled acceleration (e.g., acceleration in a windless state) and the acceleration that is determined based on changes in feature points obtained from the image G. For example, the external force information may be detected by a sensor other than the wind sensor. For example, the external force information may be obtained based on a difference between the modeled acceleration and the acceleration obtained by the acceleration sensor. More specifically, a physical model that is modeled by relationship between the motor output and the acceleration may be prepared in advance, and the external force information may be obtained based on a difference between an estimated acceleration calculated based on the physical model and an actual acceleration obtained by the accelerometer or the change in the image G, for example.

The specifying unit 103 in variation (1) specifies a part to be processed P based on the external force information. The specifying unit 103 determines at least one of a position, shape, and size of the part to be processed P based not only on the movement direction information but also on the external force information.

The relationship between the external force information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the external force information. For example, the specifying unit 103 determines a position of the part to be processed P based on the external force information.

Figure 12:
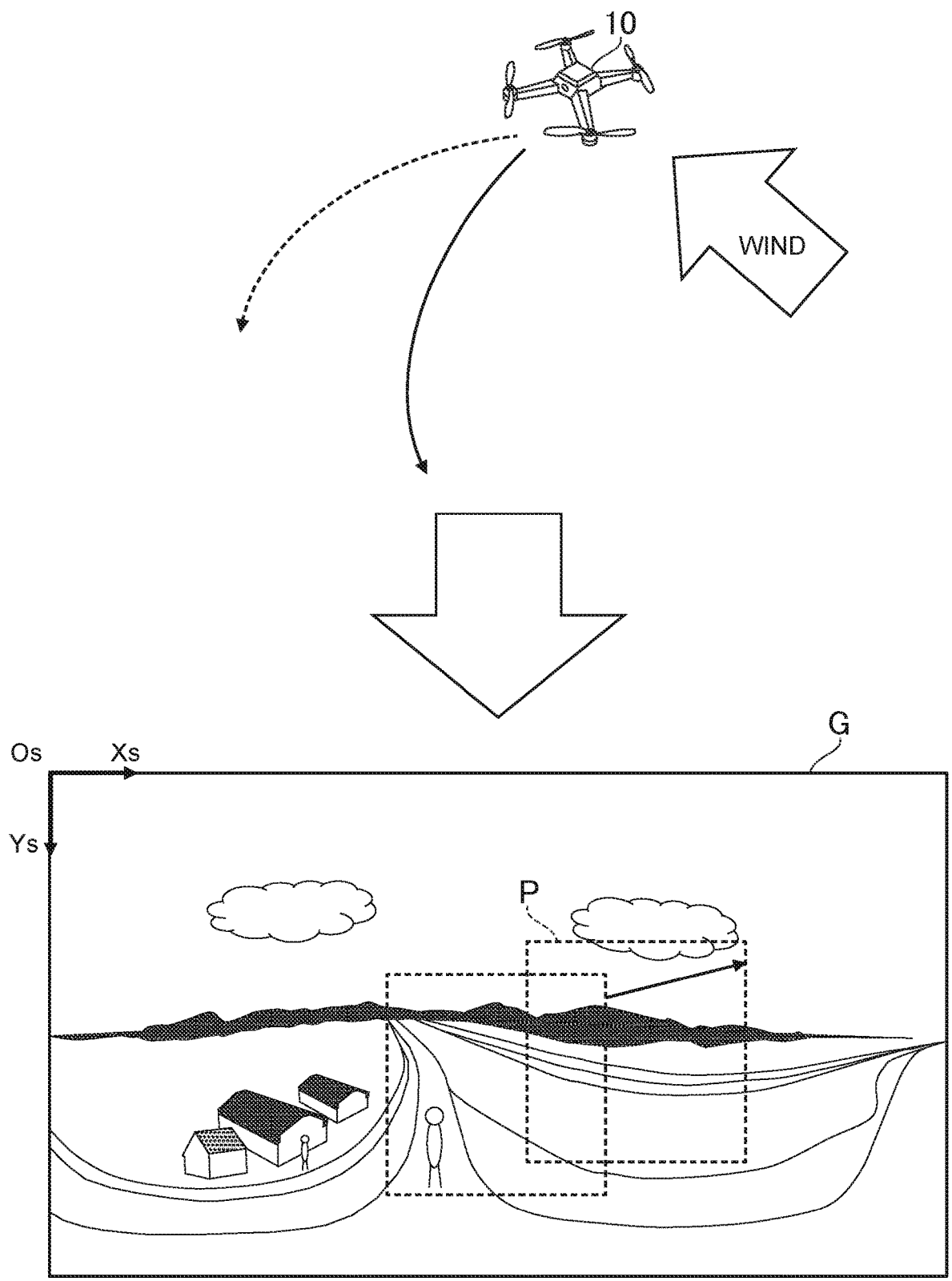
FIG. 12 is a diagram illustrating how to set a part to be processed P in variation (1)

FIG. 12 is a diagram illustrating how to set a part to be processed P in variation (1). In the example of FIG. 12, the unmanned aerial vehicle 10 receives wind from the left side. The original flight path of the unmanned aerial vehicle 10 is indicated in a solid arrow, and a flight path changeable under the influence of wind is indicated in a dotted arrow.

As shown in FIG. 12, It can be expected that the movement direction of the unmanned aerial vehicle 10 is changed to the right, and thus the specifying unit 103 moves the original part to be processed P rightward so as to set a part to be processed P. The original part to be processed P is, as described in the embodiment, a part to be processed P determined based on the movement direction information, and a part to be processed P that is set based only on the movement direction information.

For example, the specifying unit 103 estimates the movement direction after the external force is exerted based on the movement direction information and the external force information, and sets a part to be processed P based on the estimated movement direction. In this case, the specifying unit 103 may change the movement direction indicated by the movement direction information to the direction of the external force indicated by the external force information, thereby estimating the movement direction after changed. The amount of change in the movement direction may be a fixed value, or a value according to the strength of the external force indicated by the external force information.

For example, similarly to the embodiment, the specifying unit 103 may temporarily determine a part to be processed P based on the movement direction information, and move the temporarily determined part to be processed P based on the external force information. In this case, the specifying unit 103 moves the temporarily determined part to be processed P in a direction of the external force indicated by the external force information, thereby determining the final part to be processed P. The movement amount of the part to be processed P may be a fixed value, or a value according to the strength of the external force indicated by the external force information.

According to variation (1), even if external force is exerted on the unmanned aerial vehicle 10, a part to be processed P is determined by estimating influence of the external force. This serves to readily detect a specific object on the side of the movement direction that is changed by the external force, and more effectively improve safety of flight.

(2) For example, the orientation of the capturing unit 14 may be changed due to the attitude of the unmanned aerial vehicle 10, and the relationship between each position in the image G and the direction viewed from the unmanned aerial vehicle 10 may be changed. As such, a part to be processed P may be specified in view of not only the movement direction information but attitude information. The unmanned aerial vehicle control system 1 in variation (2) includes the attitude obtaining unit 107. The attitude obtaining unit 107 obtains the attitude information about the attitude of the unmanned aerial vehicle 10.

The attitude information may be indicated by angle information, such as a roll angle, pitch angle, and yaw angle, or by vector information such as a three-dimensional vector and two-dimensional vector. The attitude obtaining unit 107 obtains the attitude information based on a change in the image G or a detection result of the sensor unit 15. For example, the attitude obtaining unit 107 obtains the attitude information based on detection signals of a gyro sensor and an accelerometer in the sensor unit 15. For example, the attitude obtaining unit 107 may distinguish a sky part and a ground part from the image G using a method used in variation (10) described later, and obtain the attitude information based on the ratio between the sky part and the ground part.

The specifying unit 103 in variation (2) specifies a part to be processed P based on the attitude information. The specifying unit 103 determines at least one of a position, shape, and size of the part to be processed P based not only on the movement direction information but also on the attitude information.

The relationship between the attitude information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the attitude information. For example, the specifying unit 103 determines a position of the part to be processed P based on the attitude information.

FIG. 13 is a diagram illustrating how to set a part to be processed P in variation (2). As shown in FIG. 13, for example, if the unmanned aerial vehicle 10 is directed upward, the objects move downward as a whole on the image G, and thus the specifying unit 103 sets the part to be processed P lower than the original position. For example, if the unmanned aerial vehicle 10 is directed downward, the objects move upward as a whole on the image G, and thus the specifying unit 103 sets the part to be processed P higher than the original position.

For example, similarly to the embodiment, the specifying unit 103 may temporarily determine a part to be processed P based on the movement direction information, and move the temporarily determined part to be processed P based on the attitude information. In this case, the specifying unit 103 moves the temporarily determined part to be processed P in a direction of the attitude indicated by the attitude information, thereby determining the final part to be processed P. The movement amount of the part to be processed P may be a fixed value, or a value according to an amount of change in the attitude indicated by the attitude information.

For example, the specifying unit 103 may change the relationship between each direction viewed from the unmanned aerial vehicle 10 and positions on the image G (relationship described referring to FIG. 3) based on the attitude information, and set a part to be processed P based on the relationship after changed and the movement direction information.

According to variation (2), even if the attitude of the unmanned aerial vehicle 10 is changed, a part to be processed P is determined in view of the influence of the attitude. This serves to correctly detect a specific object in the image G, and improve safety of flight more effectively.

(3) For example, an area in which the unmanned aerial vehicle 10 can make sharp turns and approaching speed to an object are changed according to the movement velocity of the unmanned aerial vehicle 10, and thus, a part to be processed P may be specified in view of not only the movement direction information but also the movement velocity information. The unmanned aerial vehicle control system 1 in variation (3) includes the movement velocity obtaining unit 108. The movement velocity obtaining unit 108 obtains movement velocity information about movement velocity of the unmanned aerial vehicle 10.

The movement velocity information is represented by a value indicating the movement velocity itself, or a symbol indicating an extent of the movement velocity. If the movement velocity is represented by symbols, meaning of each symbol may be determined in advance, for example, A means stop, B means low speed, and C means high speed. The movement velocity obtaining unit 108 obtains the movement velocity information based on a change in the image G or a detection result of the sensor unit 15. For example, the movement velocity obtaining unit 108 obtains the movement velocity information based on a movement amount of a feature point extracted from the image G. For example, the movement velocity obtaining unit 108 obtains the movement velocity information based on acceleration detected by the accelerometer in the sensor unit 15.

The specifying unit 103 in variation (3) specifies a part to be processed P further based on the movement velocity information. The specifying unit 103 determines at least one of a position, shape, and size of the part to be processed P based not only on the movement direction information but also on the movement velocity information.

The relationship between the movement velocity information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the movement velocity information. For example, the specifying unit 103 determines at least one of a shape and a size of the part to be processed P based on the movement velocity information.

FIG. 14 is a diagram illustrating how to set a part to be processed P in variation (3). As shown in FIG. 14, for example, when the movement velocity indicated by the movement velocity information is faster, an area in which the unmanned aerial vehicle 10 can make sharp turns becomes more limited and a period of time to approach a specific object becomes shorter. As such, the specifying unit 103 may reduce the part to be processed P so as to prioritize processing speed of the detection processing. For example, when the movement velocity indicated by the movement velocity information is faster, the specifying unit 103 may change the part to be processed P to have a vertically long shape along the movement path of the unmanned aerial vehicle 10. For example, when the movement velocity indicated by the movement velocity information is slower, an area in which the unmanned aerial vehicle 10 can make sharp turns becomes wider and a period of time to approach a specific object becomes longer. As such, the specifying unit 103 may increase the part to be processed P so as to prioritize a size of an area on which the detection processing is performed. For example, when the movement velocity indicated by the movement velocity information is slower, the specifying unit 103 may change the part to be processed P to have a laterally long shape along the movement path of the unmanned aerial vehicle 10.

According to variation (3), the part to be processed P is determined in view of the movement velocity unmanned aerial vehicle 10, and thus, for example, the processing speed of the detection processing and a size of an area on which the detection processing is performed can be prioritized. This can improve safety of flight more effectively.

(4) For example, in a case where the unmanned aerial vehicle 10 flies in either one of a first flight mode, in which the unmanned aerial vehicle 10 automatically flies based on a predetermined flight path, and a second flight mode, in which the unmanned aerial vehicle 10 flies based on operation of an operator, a range to which the unmanned aerial vehicle 10 should pay attention is changed according to the flight mode. As such, a part to be processed P may be specified in view of not only on the movement direction information but also on the flight mode.

The first flight mode is a flight mode described in the embodiment. The second flight mode is a mode in which an operator manually operates the unmanned aerial vehicle 10. The operator inputs a movement direction and a movement velocity of the unmanned aerial vehicle 10 by using, for example, a tablet terminal, a smartphone, and a special input device. The unmanned aerial vehicle 10 obtains an input of the operator through the communication unit 13, and flies under the operator's direction.

The unmanned aerial vehicle control system 1 in variation (4) includes the flight mode obtaining unit 109. The flight mode obtaining unit 109 obtains flight mode information about the current flight mode of the unmanned aerial vehicle 10. The flight mode information may be any information that can identify whether a flight mode is the first flight mode or the second flight mode, and is stored in the data storage unit 100. The flight modes may be switched by an instruction of the administrator.

If the current flight mode indicated by the flight mode information is the first flight mode, as described in the embodiment, the unmanned aerial vehicle 10 flies based on the flight path data stored in the data storage unit 100. On the other hand, if the current flight mode indicated by the flight mode information is the second flight mode, the unmanned aerial vehicle 10 flies under the operator's input obtained through the communication unit 13. The input includes, for example, instructions regarding the movement direction, movement velocity, hovering, landing, and taking off.

The relationship between the input of the operator and the flight control method may be stored in the data storage unit 100 as data in program format, or numerical or table format. That is, such relationship may be defined in a portion of a program code, or in a numerical format or a table format. The unmanned aerial vehicle 10 flies under the flight control method associated with the input of the operator.

The specifying unit 103 in variation (4) specifies a part to be processed P further based on the flight mode information. The specifying unit 103 determines at least one of a position, shape, and size of the part to be processed P based not only on the movement direction information but also on the flight mode information.

The relationship between the flight mode information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the flight mode information. For example, the specifying unit 103 determines at least one of a shape and a size of the part to be processed P based on the flight mode information.

FIG. 15 is a diagram illustrating how to set a part to be processed P in variation (4). As shown in FIG. 15, for example, in the first flight mode, the unmanned aerial vehicle 10 autonomously flies on the predetermined path and making a sudden change in direction is unlikely to occur. As such, the specifying unit 103 may reduce the part to be processed P so as to prioritize processing speed of the detection processing. For example, in the second flight mode, making a sudden change in direction can occur due to an operation error by the operator. As such, the specifying unit 103 may increase the part to be processed P so as to prioritize a size of an area on which the detection processing is performed.

According to variation (4), the part to be processed P is determined in view of the flight mode of the unmanned aerial vehicle 10, and thus, for example, it is possible to prioritize the processing speed of the detection processing and a size of an area on which the detection processing is performed. This can improve safety of flight more effectively.

(5) For example, a period of time to approach a specific object or a size of an object in the image G is changed according to the altitude of the unmanned aerial vehicle 10. As such, a part to be processed P may be specified in view of not only the movement direction information but altitude information. The unmanned aerial vehicle control system 1 in variation (5) includes the altitude obtaining unit 110. The altitude obtaining unit 110 obtains altitude information about the altitude of the unmanned aerial vehicle during flight.

The altitude information is represented by a value indicating the altitude itself, or a symbol indicating an extent of the altitude. If the movement velocity is represented by symbols, meaning of each symbol may be determined in advance, for example, A means low altitude, B means middle altitude, and C means high altitude.

For example, the altitude obtaining unit 110 obtains the altitude information based on a change in the image G or a detection result of the sensor unit 15. For example, the altitude obtaining unit 110 obtains the altitude detected by the altitude sensor of the sensor unit 15 as the altitude information. The altitude sensor is a digital altimeter and may be, for example, an air pressure altimeter or a radio wave altimeter. For example, the altitude obtaining unit 110 obtains the altitude information based on a size of an object or a distance between the feature points extracted from the image G. In this case, when a size of an object is smaller, the altitude is higher, and a distance between the feature points is shorter, the altitude is higher.

The specifying unit 103 in variation (5) specifies a part to be processed P further based on the altitude information. The specifying unit 103 determines at least one of a position, shape, and size of the part to be processed P based not only on the movement direction information but also on the altitude information.

The relationship between the altitude information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the altitude information. For example, the specifying unit 103 determines at least one of a shape and a size of the part to be processed P based on the altitude information.

FIG. 16 is a diagram illustrating how to set a part to be processed P in variation (5). As shown in FIG. 16, for example, if an altitude indicated by the altitude information is high, a range captured in the image G becomes large and has a long distance from the unmanned aerial vehicle 10. As such, the specifying unit 103 may reduce the part to be processed P so as to prioritize processing speed of the detection processing. For example, if an altitude indicated by the altitude information is low, a range captured in the image G becomes small and has a short distance from the unmanned aerial vehicle 10. As such, the specifying unit 103 may increase the part to be processed P so as to prioritize a size of an area on which the detection processing is performed.

According to variation (5), the part to be processed P is set in view of the altitude of the unmanned aerial vehicle 10, and thus, for example, it is possible to prioritize the processing speed of the detection processing and a size of an area on which the detection processing is performed. This can improve safety of flight more effectively.

(6) For example, the unmanned aerial vehicle 10 may fly in an area in which a specific object is highly likely to exist, or may fly in an area in which a specific object is unlikely to exist. As such, not only the movement direction information but also ground surface information may be considered to specify a part to be processed P. The unmanned aerial vehicle control system 1 in variation (6) includes the ground surface obtaining unit 111. The ground surface obtaining unit 111 obtains ground surface information about ground surfaces of areas in which the unmanned aerial vehicle 10 flies.

The ground surface information indicates attributes of ground surfaces. For example, a ground surface is divided in a plurality of categories, and the ground surface information indicates a category of an area in which the unmanned aerial vehicle 10 flies. The categories may be any information to categorize what is on the ground, for example, city, farm village, mountainous region, river area, and coast.

For example, the ground surface obtaining unit 111 may obtain the ground surface information based on the image G or a detection result of the sensor unit 15, or obtain the ground surface information entered by an administrator through the communication unit 13, for example. For example, the data storage unit 100 may store map data, and the map data may store relationship between each spot on the ground and the ground surface information. In this case, the ground surface obtaining unit 111 obtains the ground surface information associated with the position information detected by the GPS sensor in the sensor unit 15. For example, the ground surface obtaining unit 111 may obtain the ground surface information based on color information of the image G.

The specifying unit 103 in variation (6) specifies a part to be processed P further based on the ground surface information. The specifying unit 103 determines at least one of a position, shape, and size of the part to be processed P based not only on the movement direction information but also on the ground surface information.

The relationship between the ground surface information and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the ground surface information. For example, the specifying unit 103 determines a position of the part to be processed P based on the ground surface information.

For example, if the ground surface information indicates a city, a specific object is highly likely to exist. As such, the specifying unit 103 specifies a part to be processed P in the entire image G. For example, if the ground surface information indicates a river area, a specific object is unlikely to exist. As such, the specifying unit 103 specifies a part to be processed P in the image G other than the river area.

According to variation (6), a part to be processed P is determined in view of the ground surface information, and thus, a specific object can be efficiently detected and safety of the flight can be improved in a more efficient manner.

(7) For example, when the unmanned aerial vehicle 10 automatically flies based on a predetermined flight path, the flight control unit 105 may generate a substitute flight path if a specific object is detected by the detection processing, and control the flight of the unmanned aerial vehicle based on the substitute flight path.

For example, the flight control unit 105 generates a substitute flight path so as to be away from the specific object. For example, the flight control unit 105 obtains a position of the specific object relative to the unmanned aerial vehicle 10 based on the position of the specific object in the image G. Subsequently, the flight control unit 105 may generate the substitute flight path so as to be away from the obtained position.

According to variation (7), a substitute flight path is generated when a specific object is detected, and the unmanned aerial vehicle 10 can thereby fly so as to avoid the specific object. This serves to improve safety of flight.

(8) For example, when the substitute flight path is generated in variation (7), the specifying unit 103 may specify a part to be processed P again based on the substitute flight path. The specifying unit 103 may specify a part to be processed P based on the movement direction information indicated by the substitute flight path. The method of specifying a part to be processed P based on the movement direction information may be the same as the method described in the embodiment.

According to variation (8), a part to be processed P is specified again when the substitute flight path is generated. This can detect a specific object more reliably, and improve safety of flight.

(9) For example, in the image G, a part in which a specific object is highly likely to exist may be specified based on the map data. For example, if a specific object is a person or an automobile, they are likely on a road. As such, a direction in which the road is located with respect to the unmanned aerial vehicle 10 may be specified based on the map data, and a part to be processed P may be preferentially set in such a direction.

The unmanned aerial vehicle control system 1 in variation (9) includes the map data obtaining unit 112. The map data obtaining unit 112 obtains map data of area in which the unmanned aerial vehicle 10 flies. In a case where the map data is previously stored in the data storage unit 100, the map data obtaining unit 112 obtains the map data from the data storage unit 100. In a case where the map data is stored in an external computer, the map data obtaining unit 112 obtains the map data from the external computer. The map data itself may be any known data of maps, and may indicate, for example, relationship between latitude/longitude information of spots on the earth and objects on the spots.

The specifying unit 103 in variation (9) specifies a part to be processed P further based on the map data. The specifying unit 103 determines at least one of a position, shape, and size of the part to be processed P based not only on the movement direction information but also on the map data.

The relationship between the map data and the part to be processed P may be stored in the data storage unit 100 as data in program format, or numerical or table format. That is, such relationship may be defined in a portion of a program code, or in a numerical format or a table format. The specifying unit 103 sets the part to be processed P associated with the map data. For example, the specifying unit 103 determines a position of the part to be processed P based on the map data.

For example, the specifying unit 103 specifies an object in which a specific object is highly likely to exist based on the position information of the unmanned aerial vehicle 10 and the map data. For example, if a specific object is a person and a machine, an object in which a person is likely to exist is a road, and if a specific object is a building, an object in which a building is likely to exist is an area surrounded by roads. The specifying unit 103 may set a part to be processed P at the specified position.

According to variation (9), a part to be processed P is determined using the map data, and thus, a specific object can be readily detected. This can improve safety of flight more effectively.

(10) For example, the image G includes not only scenes on the ground but also scenes in the sky. If a specific object is unlikely to exist in the sky, a part to be processed P may not be set in an area in which the sky is captured.

The unmanned aerial vehicle control system 1 of the variation (10) includes the distinguishing unit 113. The distinguishing unit 113 distinguishes a sky part in which the sky is captured from a ground part in which the ground is captured in the image G. For example, the distinguishing unit 113 refers to a pixel value of each pixel in the image G, and if a pixel is within a range of pixel values indicating colors of the sky, classifies such a pixel in the sky part, and if not, classifies such a pixel in the ground part. The range of pixel values indicating colors of the sky may be fixed values, or variable values. If the range is a variable value, the value may be changed according to time, season, or weather, for example.

The specifying unit 103 in this variation specifies a part to be processed P in the ground part. For example, the specifying unit 103 may not set a part to be processed P in the sky part of the image G, or may lower the priority of the sky part than the priority of the ground part.

According to variation (10), a part to be processed P is set in the ground part, and thus the processing of setting the part to be processed P can be improved effectively.

(11) For example, when a specific object is detected in the image G, basically the specific object does not suddenly disappear. As such, when a specific object is detected by the detection processing executed in the past, the specifying unit 103 may specify a part to be processed P further based on the part at which the specific object is detected in the image G. In this case, the specifying unit 103 determines the part to be processed P so as to include a position at which a specific object is detected last time or a specific object is detected within a predetermined period of time. That is, the specifying unit 103 sets a part to be processed P so as to trace a previously detected specific object.

According to variation (11), a part to be processed P can be set in a manner to trace the previously detected specific object. In this manner, a specific object can be detected more reliably, and thus safety of flight can be improved.

(12) For example, in the embodiment, the case has been described in which the detection processing is performed only on a part to be processed P, although the detection processing may be performed on a part other than a part to be processed P at a low frequency. In this case, the processing unit 104 performs the detection processing on a part other than a part to be processed P at a first frequency, and performs the detection processing on the part to be processed P at a second frequency, which is higher than the first frequency.

Further, the processing unit 104 may set a plurality of parts to be processed P, and determine a frequency at which the detection processing is performed for each part to be processed P based on a priority of each part to be processed P. In this case, the processing unit 104 may determine a frequency of each part to be processed P such that a part to be processed P having higher priority has higher frequency. That is, the processing unit 104 may determine a frequency of each part to be processed P such that a part to be processed P has a higher frequency when the part to be processed P is closer to the movement direction, and has a lower frequency when the part to be processed P is more away from the movement direction.

According to variation (12), the detection processing is performed at a low frequency on a part other than a part to be processed P in the image G, and performed at a high frequency on a part to be processed P. This serves to quickly detect a specific object and improve safety of flight. Further, a specific object can be also detected from a part to be processed P that is not so important, and this improves safety of flight more effectively.

(13) For example, two or more of the above described variations (1) to (12) may be combined.

For example, the unmanned aerial vehicle control system may include a computer other than the unmanned aerial vehicle 10, and flight of the unmanned aerial vehicle 10 may be controlled by the computer.

Figure 17:
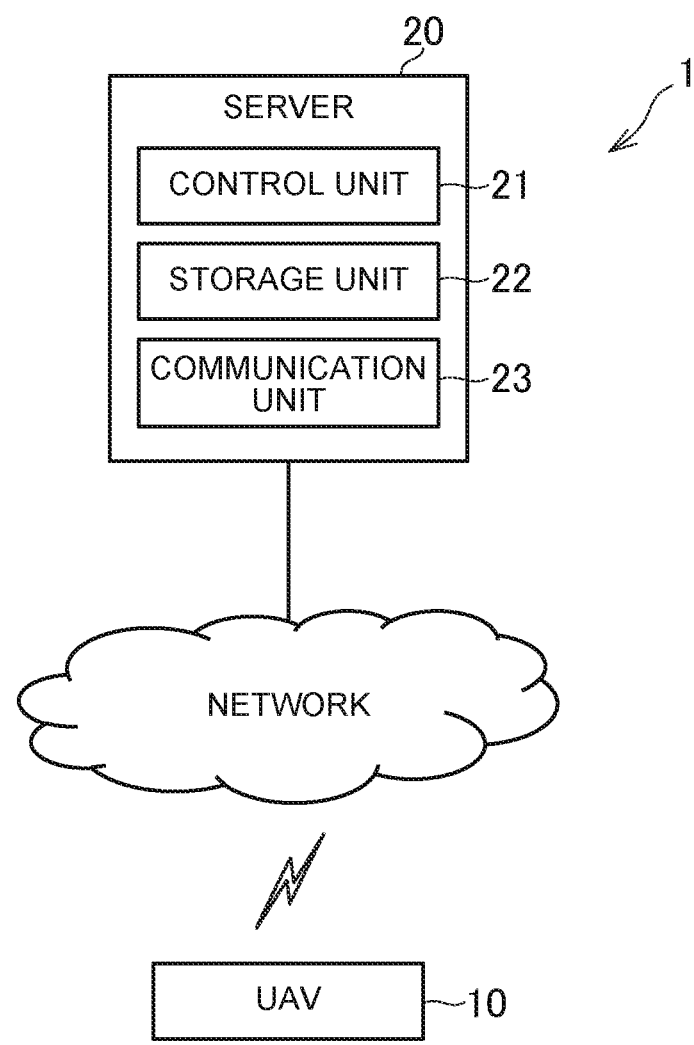
FIG. 17 is a diagram illustrating an overall configuration of the unmanned aerial vehicle control system according to the variations.

FIG. 17 is a diagram illustrating an overall configuration of the unmanned aerial vehicle control system 1 according to a variation. As shown in FIG. 17, the unmanned aerial vehicle control system 1 includes an unmanned aerial vehicle 10 and a server 20. The unmanned aerial vehicle 10 and the server 20 are connected to a network, such as the Internet. The number of the server 20 may be one, or two or more.

The server 20 is a server computer and includes a control unit 21, a storage unit 22, and a communication unit 23. The hardware configurations of the control unit 21, the storage unit 22, and the communication unit 23 are the same as the hardware configurations of the control unit 11, the storage unit 12, and the communication unit 13, respectively, and thus descriptions thereof are omitted here.

The data storage unit 100 may be implemented mainly by the storage unit 22 of the server 20. In this case, the unmanned aerial vehicle 10 may obtain data stored in the data storage unit 100 of the server 20 through a network. For example, the image obtaining unit 101 may be implemented mainly by the control unit 21 of the server 20. In this case, the image obtaining unit 101 may obtain the image G from the unmanned aerial vehicle 10 through a network, or, if the capturing unit 14 has communication functions, the image obtaining unit 101 may obtain the image G from the capturing unit 14.

For example, the movement direction obtaining unit 102 may be implemented mainly by the control unit 21 of the server 20. In this case, the movement direction obtaining unit 102 obtains the image G or a detection result of the sensor unit 15 through a network, and obtains the movement direction information. For example, the specifying unit 103 may be implemented mainly by the control unit 21 of the server 20. In this case, the specifying unit 103 may obtain the movement direction information from the movement direction obtaining unit 102 of the unmanned aerial vehicle 10, or from the movement direction obtaining unit 102 of the server 20.

For example, the processing unit 104 may be implemented mainly by the control unit 21 of the server 20. In this case, the processing unit 104 may obtain the movement direction information from the specifying unit 103 of the unmanned aerial vehicle 10, or from the specifying unit 103 of the server 20. For example, the flight control unit 105 may be implemented mainly by the control unit 21 of the server 20. In this case, the flight control unit 105 may obtain a detection result of a specific object from the processing unit 104 of the unmanned aerial vehicle 10, or from the processing unit 104 of the server 20. The flight control method may be the same as the processing in the embodiment and the variations described above. The flight control unit 105 controls flight of the unmanned aerial vehicle 10 by sending the number of rotations of motors to the unmanned aerial vehicle 10, for example. The unmanned aerial vehicle 10 controls the motors based on the instruction from the flight control unit 105 of the server 20.

For example, the functions described above may be implemented in any of the computers in the unmanned aerial vehicle control system 1, and may be shared among the unmanned aerial vehicle 10 and other computer, such as the server 20, or among a plurality of unmanned aerial vehicles 10.

The invention claimed is:

1. An unmanned aerial vehicle control system comprising at least one processor configured to:

obtain an image in which surroundings of an unmanned aerial vehicle are captured, the unmanned aerial vehicle being movable in any direction;

wherein the image includes a front facing direction of the UAV, a back facing direction of the UAV, a left facing direction of the UAV, and a right facing direction of the UAV;
obtain movement direction information about a movement direction of the unmanned aerial vehicle based on a difference between the image and a previous image in which surroundings of the unmanned aerial vehicle were captured;
wherein the system extracts a plurality of feature points from the previous image and obtains the movement direction based on a feature point movement direction of each of the plurality of feature points obtained from a change of a location of each of the plurality of feature points from the previous image to the image;
specify a part of the image to be preferentially processed and determine a shape or a size of the part of the image to be preferentially processed based on the obtained movement direction information;
 wherein the part of the image to be preferentially processed is a two-dimensional shape;
 wherein the preferential processing is detection processing to detect a specific object;
 wherein the movement direction is obtained before the part of the image to be preferentially processed in specified;
perform processing on the part to be processed;
control flight of the unmanned aerial vehicle based on a result of the processing;
wherein the unmanned aerial vehicle flies in either a first flight mode, in which the unmanned aerial vehicle automatically flies based on a predetermined flight path, or a second flight mode, in which the unmanned aerial vehicle flies under an operation of an operator,
the unmanned aerial vehicle comprises at least one processor that is configured to:
 obtain flight mode information about a current flight mode of the unmanned aerial vehicle,
 specify the part to be preferentially processed and determine a shape or a size of the part of the image to be preferentially processed further based on the flight mode information;
wherein the system performs the processing in both the first mode and the second mode; and
wherein the system determines the size of the part to be processed to be smaller in the first mode than in the second mode.

2. The unmanned aerial vehicle control system according to claim 1, wherein the at least one processor is configured to:
obtain external force information about external force on the unmanned aerial vehicle, and
specify the part to be processed further based on the external force information.

3. The unmanned aerial vehicle control system according to claim 1, wherein the at least one processor is configured to:
obtain attitude information about an attitude of the unmanned aerial vehicle, and
specify the part to be processed further based on the attitude information.

4. The unmanned aerial vehicle control system according to claim 1, wherein the at least one processor is configured to:
obtain movement velocity information about movement velocity of the unmanned aerial vehicle, and
specify the part to be processed further based on the movement velocity information.

5. The unmanned aerial vehicle control system according to claim 1, wherein the at least one processor is configured to:
obtain altitude information about an altitude of the unmanned aerial vehicle during flight, and
specify the part to be processed further based on the altitude information.

6. The unmanned aerial vehicle control system according to claim 1, wherein the at least one processor is configured to:
obtain ground surface information about a ground surface of an area in which the unmanned aerial vehicle flies, and
specify the part to be processed further based on the ground surface information.

7. The unmanned aerial vehicle control system according to claim 1, wherein
the unmanned aerial vehicle is configured to automatically fly based on the predetermined flight path, and
the at least one processor is configured to generate a substitute flight path in a case where the specific object is detected by the detection processing, and controls flight of the unmanned aerial vehicle based on the substitute flight path.

8. The unmanned aerial vehicle control system according to claim 7, wherein
in a case where the substitute flight path is generated, the at least one processor is configured to specify the part to be processed again based on the substitute flight path.

9. The unmanned aerial vehicle control system according to claim 1, wherein the at least one processor is configured to:
obtain map data of an area in which the unmanned aerial vehicle flies, and
specify the part to be preferentially processed and determine a shape or a size of the part of the image to be preferentially processed further based on the map data.

10. The unmanned aerial vehicle control system according to claim 1, wherein the at least one processor is configured to:
distinguish a sky part, in which an image of a sky is captured, from a ground part, in which an image of a ground is captured, in the image, and
specify the part to be processed in the ground part.

11. The unmanned aerial vehicle control system according to claim 1, wherein
in a case where the specific object is detected by the detection processing executed previously, the at least one processor is configured to specify the part to be processed further based on a part of the image in which the specific object is detected.

12. The unmanned aerial vehicle control system according to claim 1, wherein
the image is an image in which at least all horizontal directions are captured.

13. The unmanned aerial vehicle control system according to claim 1, wherein
the specific object is an object that the unmanned aerial vehicle should avoid.

14. The unmanned aerial vehicle control system according to claim 1, wherein the at least one processor is configured to not perform the processing on a part other than the part to be processed, and performs the processing only on the part to be processed.

15. The unmanned aerial vehicle control system according to claim 1, wherein
the at least one processor is configured to perform the processing on a part other than the part to be processed at a first frequency, and performs the processing on the part to be processed at a second frequency, which is higher than the first frequency.

16. The unmanned aerial vehicle control system according to claim 1, wherein the specific object is an animal, a building, or a machine.

17. The unmanned aerial vehicle control system according to claim 1, wherein the at least one processor is configured to identify predetermined regions of the image based on possible movement directions of the unmanned aerial vehicle before the part of the image to be preferentially processed in specified.

18. The unmanned aerial vehicle control system according to claim 17, wherein the regions are identified along the X-axis of the image.

19. An unmanned aerial vehicle control method comprising:
obtaining an image in which surroundings of an unmanned aerial vehicle are captured, the unmanned aerial vehicle being movable in any direction;
wherein the image includes a front facing direction of the UAV, a back facing direction of the UAV, a left facing direction of the UAV, and a right facing direction of the UAV;
obtaining movement direction information about a movement direction of the unmanned aerial vehicle based on a difference between the image and a previous image in which surroundings of the unmanned aerial vehicle were captured;
wherein the method comprises extracting a plurality of feature points from the previous image and obtaining the movement direction based on a feature point movement direction of each of the plurality of feature points obtained from a change of a location of each of the plurality of feature points from the previous image to the image;
specifying a part of the image to be preferentially processed and determining a shape or a size of the part of the image to be preferentially processed based on the obtained movement direction information;
wherein the part of the image to be preferentially processed is a two-dimensional shape;
wherein the preferential processing is detection processing to detect a specific object;
wherein the movement direction is obtained before the part of the image to be preferentially processed in specified;
performing processing on the part to be processed;
controlling flight of the unmanned aerial vehicle based on a result of the processing;
flying the unmanned aerial vehicle in either a first flight mode, in which the unmanned aerial vehicle automatically flies based on a predetermined flight path, or a second flight mode, in which the unmanned aerial vehicle flies under an operation of an operator,
wherein the unmanned aerial vehicle comprises at least one processor that is configured to:
obtain flight mode information about a current flight mode of the unmanned aerial vehicle,
specify the part to be preferentially processed and determine a shape or a size of the part of the image to be preferentially processed further based on the flight mode information;
performing the processing in both the first mode and the second mode; and
determining the size of the part to be processed to be smaller in the first mode than in the second mode.

20. A non-transitory computer-readable information storage medium for storing a program for causing a computer to:
obtain an image in which surroundings of an unmanned aerial vehicle are captured, the unmanned aerial vehicle being movable in any direction;
wherein the image includes a front facing direction of the UAV, a back facing direction of the UAV, a left facing direction of the UAV, and a right facing direction of the UAV;
obtain movement direction information about a movement direction of the unmanned aerial vehicle based on a difference between the image and a previous image in which surroundings of the unmanned aerial vehicle were captured;
wherein the computer extracts a plurality of feature points from the previous image and obtains the movement direction based on a feature point movement direction of each of the plurality of feature points obtained from a change of a location of each of the plurality of feature points from the previous image to the image;
specify a part of the image to be preferentially processed and determine a shape or a size of the part of the image to be preferentially processed based on the obtained movement direction information;
wherein the part of the image to be preferentially processed is a two-dimensional shape;
wherein the preferential processing is detection processing to detect a specific object;
wherein the movement direction is obtained before the part of the image to be preferentially processed in specified;
perform processing on the part to be processed;
control flight of the unmanned aerial vehicle based on a result of the processing;
fly the unmanned aerial vehicle in either a first flight mode, in which the unmanned aerial vehicle automatically flies based on a predetermined flight path, or a second flight mode, in which the unmanned aerial vehicle flies under an operation of an operator,
wherein the unmanned aerial vehicle comprises at least one processor that is configured to:
obtain flight mode information about a current flight mode of the unmanned aerial vehicle,
specify the part to be preferentially processed and determine a shape or a size of the part of the image to be preferentially processed further based on the flight mode information;
perform the processing in both the first mode and the second mode; and
determine the size of the part to be processed to be smaller in the first mode than in the second mode.

* * * * *